(12) United States Patent
Klein et al.

(10) Patent No.: US 9,306,870 B1
(45) Date of Patent: Apr. 5, 2016

(54) EMULATING CIRCUIT SWITCHING IN CLOUD NETWORKING ENVIRONMENTS

(75) Inventors: Matthew D. Klein, Seattle, WA (US); Michael David Marr, Monroe, WA (US)

(73) Assignee: Amazon Technologies, Inc., Reno, NV (US)

( * ) Notice: Subject to any disclaimer, the term of this patent is extended or adjusted under 35 U.S.C. 154(b) by 124 days.

(21) Appl. No.: 13/535,715

(22) Filed: Jun. 28, 2012

(51) Int. Cl.
| | |
|---|---|
| *H04L 12/911* | (2013.01) |
| *H04L 29/06* | (2006.01) |
| *H04L 12/815* | (2013.01) |
| *H04L 29/08* | (2006.01) |

(52) U.S. Cl.
CPC ........ *H04L 47/783* (2013.01); *H04L 29/06176* (2013.01); *H04L 29/08* (2013.01); *H04L 47/22* (2013.01)

(58) Field of Classification Search
CPC . H04L 41/12; H04L 41/0896; H04L 67/2861; H04L 47/783; H04L 47/22; H04L 29/06176; G06F 9/5077
See application file for complete search history.

(56) References Cited

U.S. PATENT DOCUMENTS

| | | | |
|---|---|---|---|
| 5,692,174 | A | 11/1997 | Bireley et al. |
| 6,421,728 | B1 | 7/2002 | Mohammed et al. |
| 6,493,685 | B1 | 12/2002 | Ensel et al. |
| 7,412,538 | B1 | 8/2008 | Eytchison et al. |
| 7,637,426 | B1 | 12/2009 | Green |
| 7,743,001 | B1 | 6/2010 | Vermeulen et al. |
| 7,768,920 | B2 | 8/2010 | Goshen et al. |
| 7,870,044 | B2 | 1/2011 | Robertson |
| 8,024,225 | B1 | 9/2011 | Sirota et al. |
| 8,055,493 | B2 | 11/2011 | Rolia et al. |
| 8,595,191 | B2 | 11/2013 | Prahlad et al. |
| 8,615,584 | B2 | 12/2013 | Dawson et al. |
| 2003/0028642 | A1 | 2/2003 | Agarwal et al. |
| 2003/0088482 | A1 | 5/2003 | Blumberg |
| 2003/0126196 | A1 | 7/2003 | Lagimonier et al. |
| 2003/0229529 | A1 | 12/2003 | Mui et al. |
| 2004/0030740 | A1 | 2/2004 | Stelting |
| 2004/0243430 | A1 | 12/2004 | Horstemeyer |
| 2005/0157646 | A1* | 7/2005 | Addagatla et al. ............ 370/232 |
| 2006/0159014 | A1 | 7/2006 | Breiter et al. |
| 2007/0219837 | A1 | 9/2007 | Lu et al. |
| 2008/0080396 | A1 | 4/2008 | Meijer et al. |

(Continued)

OTHER PUBLICATIONS

"Amazon EC2 Spot Instance," Amazon Web Services LLC, Downloaded Mar. 26, 2012, pp. 1-11.

(Continued)

*Primary Examiner* — Omer S Mian
(74) *Attorney, Agent, or Firm* — Robert C. Kowert; Meyertons, Hood, Kivlin, Kowert & Goetzel, P.C.

(57) ABSTRACT

Methods and apparatus for emulating circuit switching in cloud networking environments are disclosed. A system includes a plurality of resources of a provider network and a resource manager. The resource manager receives a circuit switching emulation request specifying (a) a first resource group and a second resource group, and (b) a desired network traffic rate to be supported between the first and second resource groups. In response to a determination to accept the circuit switching emulation request, the resource manager initiates configuration operations associated with a network path between the first and second resource groups to allow network traffic between the first and second resource groups at a rate up to the desired network traffic rate.

21 Claims, 21 Drawing Sheets

(56) References Cited

U.S. PATENT DOCUMENTS

| | | | |
|---|---|---|---|
| 2008/0103848 | A1 | 5/2008 | Santos et al. |
| 2008/0167928 | A1 | 7/2008 | Cao et al. |
| 2008/0243666 | A1 | 10/2008 | Rowan |
| 2009/0049114 | A1 | 2/2009 | Faraj |
| 2009/0182598 | A1 | 7/2009 | An et al. |
| 2009/0276771 | A1 | 11/2009 | Nickolov et al. |
| 2009/0281952 | A1 | 11/2009 | Toffey et al. |
| 2009/0300635 | A1 | 12/2009 | Ferris |
| 2010/0010657 | A1 | 1/2010 | Do et al. |
| 2010/0050172 | A1 | 2/2010 | Ferris |
| 2010/0070397 | A1 | 3/2010 | Hahn-Carlson et al. |
| 2010/0131624 | A1 | 5/2010 | Ferris |
| 2010/0131649 | A1 | 5/2010 | Ferris |
| 2010/0217865 | A1 | 8/2010 | Ferris |
| 2010/0241479 | A1 | 9/2010 | Chaushev |
| 2010/0306379 | A1 | 12/2010 | Ferris |
| 2011/0119104 | A1 | 5/2011 | Levine et al. |
| 2011/0131335 | A1 | 6/2011 | Spaltro et al. |
| 2011/0137805 | A1 | 6/2011 | Brookbanks et al. |
| 2011/0138050 | A1 | 6/2011 | Dawson et al. |
| 2011/0138051 | A1 | 6/2011 | Dawson et al. |
| 2011/0145094 | A1 | 6/2011 | Dawson et al. |
| 2011/0145392 | A1 | 6/2011 | Dawson et al. |
| 2011/0154353 | A1 | 6/2011 | Theroux et al. |
| 2011/0161964 | A1 | 6/2011 | Piazza et al. |
| 2011/0173038 | A1 | 7/2011 | Moon et al. |
| 2011/0173626 | A1 | 7/2011 | Chi et al. |
| 2011/0179132 | A1 | 7/2011 | Mayo et al. |
| 2011/0202657 | A1 | 8/2011 | Chang |
| 2011/0213691 | A1 | 9/2011 | Ferris et al. |
| 2011/0213712 | A1 | 9/2011 | Hadar et al. |
| 2011/0238458 | A1 | 9/2011 | Purcell et al. |
| 2011/0295986 | A1 | 12/2011 | Ferris et al. |
| 2011/0295998 | A1 | 12/2011 | Ferris et al. |
| 2011/0296025 | A1 | 12/2011 | Lieblich et al. |
| 2012/0016721 | A1 | 1/2012 | Weinman |
| 2012/0131161 | A1 | 5/2012 | Ferris et al. |
| 2012/0159506 | A1 | 6/2012 | Barham et al. |
| 2012/0173725 | A1 | 7/2012 | Verma |
| 2013/0111027 | A1 | 5/2013 | Milojicic et al. |
| 2013/0173418 | A1 | 7/2013 | Goad et al. |
| 2013/0212279 | A1 | 8/2013 | Dutta |
| 2013/0232252 | A1 | 9/2013 | Huang |
| 2013/0238785 | A1 | 9/2013 | Hawk |
| 2013/0246208 | A1 | 9/2013 | Jain et al. |

OTHER PUBLICATIONS

"Amazon EC2 Instance Types," Amazon Web Services LLC, Downloaded Mar. 26, 2012, pp. 1-5.
"Amazon EC2 Reserved Instances," Amazon Web Services LLC, Downloaded Mar. 26, 2012, pp. 1-6.
"Amazon EC2 Instance Purchasing Options," Amazon Web Services LLC, Downloaded Mar. 26, 2012, pp. 1-2.
"Amazon EC2 Pricing," Amazon Web Services LLC, Downloaded Mar. 26, 2012, pp. 1-8.
Amazon Web Services: AWS Products & Solutions, "High Performance Computing (HPC) on AWS," downloaded from aws.amazon.com/hpc-applications/ on May 16, 2012, pp. 1-3.
Timo Schneider (personal website), "An Oblivious Routing Congestion Simulator," downloaded from perlplexity.org/Research/ORCS/ on May 16, 2012, pp. 1-8.
AWS Documentation, "Using Cluster Instances," downloaded from docs.amazonwebservices.com/AWSEC2/latest/UserGuide/using_cluster_computing.html on May 16, 2012, pp. 1-6.
U.S. Appl. No. 13/331,750, filed Dec. 20, 2011, Amazon Technologies, Inc.
U.S. Appl. No. 13/431,379, filed Mar. 27, 2012, David John Ward, Jr.
U.S. Appl. No. 13/431,388, filed Mar. 27, 2012, David John Ward, Jr., et al.
U.S. Appl. No. 13/429,957, filed Mar. 26, 2012, David John Ward, Jr., et al.
U.S. Appl. No. 13/431,355, filed Mar. 27, 2012, David John Ward, Jr.
U.S. Appl. No. 13/429,985, filed Mar. 26, 2012, David John Ward, Jr., et al.
U.S. Appl. No. 13/431,348, filed Mar. 27, 2012, David John Ward, Jr., et al.
U.S. Appl. No. 13/431,360, filed Mar. 27, 2012, David John Ward, Jr.
U.S. Appl. No. 13/430,003, filed Mar. 26, 2012, David John Ward, Jr., et al.
U.S. Appl. No. 13/431,393, filed Mar. 27, 2012, David John Ward, Jr.
U.S. Appl. No. 13/475,399, filed May 18, 2012, David John Ward, Jr.
U.S. Appl. No. 13/475,359, filed May 18, 2012, David John Ward, Jr.
U.S. Appl. No. 13/461,605, filed May 1, 2012, David John Ward, Jr., et al.
U.S. Appl. No. 13/476,828, filed May 21, 2012, David John Ward, Jr., et al.
U.S. Appl. No. 13/475,461, filed May 18, 2012, David John Ward, Jr., et al.
U.S. Appl. No. 13/535,720, filed Jun. 28, 2012, Matthew D. Klein, et al.
U.S. Appl. No. 13/535,725, filed Jun. 28, 2012, Matthew D. Klein, et al.
U.S. Appl. No. 13/535,707, filed Jun. 28, 2012, Matthew D. Klein, et al.
Amazon Web Services, "Discussion Forums; Existing Connections Dropped Rudely when Instance Taken out of ELB", Eric Hammond, Feb. 25, 2011, pp. 1-4.
Amazon Web Services, "Amazon Elastic Compute Cloud (Amazon EC2)", Mar. 24, 2011, pp. 1-26.
Amazon Web Services, "Amazon EC2 Pricing", Feb. 28, 2011, pp. 1-13.
Amazon Web Services, "Amazon EC2 Spot Instances", Feb. 24, 2011, pp. 1-5.
Amazon Web Services, "Amazon CloudWatch", Feb. 24, 2011, pp. 1-5.
Agarwal, Sharad, et al. "Volley: Automated Data Placement for Geo-Distributed Cloud Services." 2010, pp. 1-16.

* cited by examiner

EMULATING CIRCUIT SWITCHING IN CLOUD NETWORKING ENVIRONMENTS

BACKGROUND

Many companies and other organizations operate computer networks that interconnect numerous computing systems to support their operations, such as with the computing systems being co-located (e.g., as part of a local network) or instead located in multiple distinct geographical locations (e.g., connected via one or more private or public intermediate networks). For example, data centers housing significant numbers of interconnected computing systems have become commonplace, such as private data centers that are operated by and on behalf of a single organization, and public data centers that are operated by entities as businesses to provide computing resources and services to customers. Some public data center operators provide network access, power, and secure installation facilities for hardware owned by various customers, while other public data center operators provide "full service" facilities that also include hardware resources made available for use by their customers. However, as the scale and scope of typical data centers has increased, the tasks of provisioning, administering, and managing the physical computing resources have become increasingly complicated.

The advent of virtualization technologies for commodity hardware has provided benefits with respect to managing large-scale computing resources for many customers with diverse service needs, allowing various computing resources and services to be efficiently and securely shared by multiple customers. For example, virtualization technologies may allow a single physical computing machine to be shared among multiple users by providing each user with one or more virtual machines hosted by the single physical computing machine, with each such virtual machine being a software simulation acting as a distinct logical computing system that provides users with the illusion that they are the sole operators and administrators of a given hardware computing resource, while also providing application isolation and security among the various virtual machines. Furthermore, some virtualization technologies are capable of providing virtual resources that span two or more physical resources, such as a single virtual machine with multiple virtual processors that spans multiple distinct physical computing systems. As another example, virtualization technologies may allow data storage hardware to be shared among multiple users by providing each user with a virtualized data store which may be distributed across multiple data storage devices, with each such virtualized data store acting as a distinct logical data store that provides users with the illusion that they are the sole operators and administrators of the data storage resource.

In many environments, various types of distributed applications may be implemented using virtualized compute and storage resources that may span numerous devices. For example, some provider network operators may be able to provision clusters of virtual compute instances suitable for high-performance applications that may potentially require high bandwidth interconnections between the nodes of the cluster, where each node includes high-end processing cores. In other examples, collections of virtual compute and storage nodes may be combined in various ways to implement general-purpose or special-purpose database systems. Different resources within the collection may have different roles in the distributed application; e.g., some resources may have supervisory roles over other resources, others may have worker roles that have tasks assigned to them by the supervisors, and so on. Traditionally, at least in some provider networks, the bandwidth usage limits for various types of resources have been set by the operators without an awareness of the roles played by the resources within their distributed applications, e.g., all compute resources of a certain compute capability may be assigned the same bandwidth usage limits. Such application-unaware bandwidth usage limits can potentially lead to undesirable results, such as oversubscription scenarios in which the provider network operator cannot provide the promised bandwidth to all the resources simultaneously, ultimately resulting in lowered client satisfaction levels.

Figure 1:
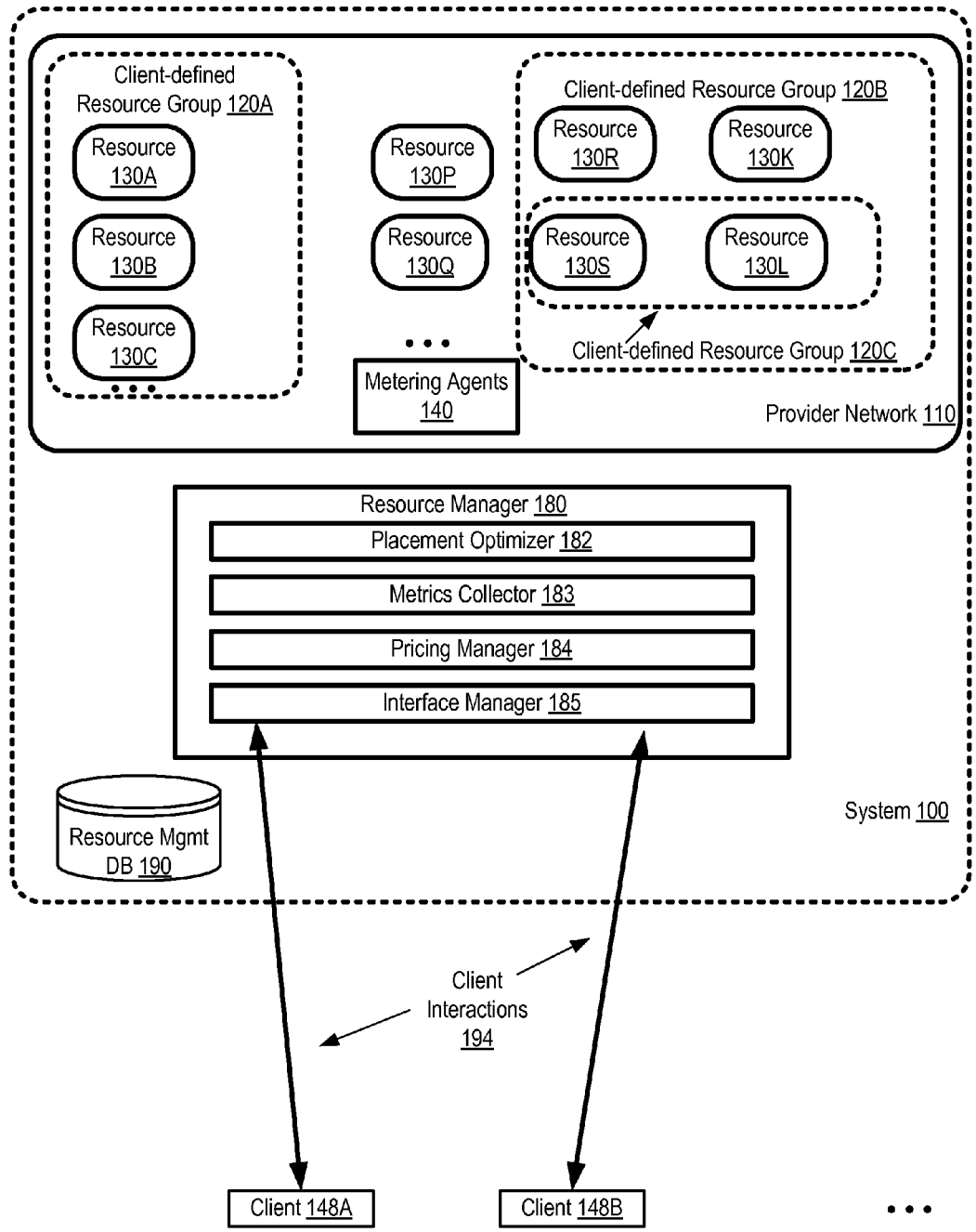
FIG. 1 illustrates an example system environment, according to at least some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION OF EMBODIMENTS

Various embodiments of methods and apparatus for supporting several different modes of client-initiated network bandwidth distribution for resource groups in cloud computing environments are described, including for example techniques for establishment of client-specified bandwidth pools, emulation of virtual circuits between specified cloud resource endpoints, and virtual machine placement which optimizes network bandwidth consumption. Networks set up by an entity such as a company or a public sector organization to provide one or more services accessible via the Internet and/or other networks to a distributed set of clients may be termed provider networks in this document. The services may include a core set of infrastructure-related services such as provisioning of computing platforms or storage platforms, as well as more advanced services that are built using the core services, such as database services, load balancing services, application deployment services, search services and the like. Such a provider network may include numerous data centers, each comprising potentially large numbers of computing platforms or devices, such as collections of physical and/or virtualized computer servers, storage devices, networking equipment and the like, needed to implement and distribute services offered by the provider. In some provider networks, resources configured on the platforms may in some embodiments be offered for reservation by (and allocation to) clients in units called "instances," such as virtual or physical compute instances or storage instances. A virtual compute instance may, for example, comprise one or more servers with a specified computational capacity (which may be specified by indicating the type and number of CPUs, the main memory size, storage device number and size, and so on) and a specified software stack (e.g., a particular version of an operating system, which may in turn run on top of a hypervisor). A number of different types of computing devices may be used singly or in combination to implement the resources of the provider network in different embodiments, including general purpose or special purpose computer servers, storage devices, network devices and the like.

In at least some embodiments, the provider network may include a set of one or more computing devices configured as a resource manager responsible for such tasks as reserving and allocating various resources to clients in response to client requests, collecting metrics from various devices to determine the health of the system and/or to help with the generation of billing records, adjusting prices of various dynamically-priced components of the provider network, and so on. The resource manager may implement a number of different programmatic interfaces for client interactions—e.g., various types of application programming interfaces, web pages, command-line tools, graphical user interfaces and the like may be implemented by an interface manager subcomponent of the resource manager in some embodiments. In one embodiment, the resource manager may provide an interface or interfaces to allow clients to define resource groups to be used as logical containers for the resources allocated currently (or in the future) to the clients. For example, in such an embodiment, one client may create a resource group to contain various compute instances that are to be used for a high-performance clustered application. Resource group creation may be advantageous to the client for a number of reasons in different embodiments—e.g., to provide a hint to the resource manager regarding the common purpose of the resources of the group (which may in turn be helpful to the resource manager in deciding how the resources should be arranged or deployed using the hardware platforms available), to obtain more meaningful billing information, or simply as a way to organize the client's fleet of resources in a more intuitive and easy-to-understand hierarchy (which, for example, may simplify operational management or accounting). A client may in some embodiments transfer resources (from among the resources allocated to the client) in and out of the defined resource group as needed. For example, a request to launch or instantiate a compute instance may be accompanied by a specification of the resource group in which the instantiated resource is to be placed.

The resource manager may allow a client to specify a total bandwidth rate, with respect to one or more types of network traffic, for a given resource group created on behalf of the client in some embodiments. Examples of the different types of network traffic for which bandwidth rates may be specified are described below in further detail. In one embodiment, one of the interfaces supported by the resource manager may allow a client to submit a "bandwidth pool" creation request for a resource group, indicating the total network transfer rate limit (e.g., 10 Gigabits per second or Gbps) for the collection of resources of the group, with respect to traffic transmitted from any of the resources to any other resource within the group. In this example, if the group comprised three compute instances CI1, CI2 and CI3, setting the total intra-group network transfer rate to 10 Gbps would indicate in one implementation that, at any given time for which the rate limit is applicable, the sum of the traffic rates from any of the three instances CI1, CI2 or CI3 to any of the other instances of the group should not exceed 10 Gbps. If CI1 were sending data at 5 Gbps to CI2 and CI2 were sending traffic to CI3 at 3 Gbps, and that was the only traffic being sent from either CI1 or CI2, the maximum rate at which CI3 could send traffic to either of the other instances would be 2 Gbps according to the specified 10 Gbps limit. In another scenario, the intra-group rates may be set as the "per instance" limit rather than the aggregate limit of the resource group. For example, suppose interface transmit and receive rates are set to 5 Gbps for each of CI1, CI2 and CI3. If CI1 were sending data at 2 Gbps to CI2 and 2 Gbps to CI3, it can send up to 1 Gbps additional traffic to either CI2 or CI3. However, CI2 could send up to 5 Gbps to CI1 or 3 Gbps to CI3 (since CI3 is already receiving 2 Gbps from CI1, it cannot receive the full 5 Gbps anymore). Traffic rate limits could also be set separately for traffic within a resource group (intra-group) versus outgoing (extra-group) traffic that has a destination outside the group in another embodiment, or a combined limit could be the specified for incoming and outgoing traffic from a particular resource or group in some embodiments. The resource manager may store an indication of the total network traffic rate of the group in a persistent repository in some embodiments, such as a resource management database. Traffic rates may be specified using any of several different units or metrics in different embodiments; for example, as an average amount of data transmittable per unit time over a specified time interval, as a total amount of data transmittable over a specified time interval (independent of the distribution of the traffic during the time interval), as a peak data transfer rate measured over a set of sampling intervals, as a $90^{th}$ or $95^{th}$ percentile of peak data transfer rates, and so on.

Having specified the total network transfer rate for the group, the client could allocate portions of the total rate to individual resources of the group. Continuing the above example, the client could submit a bandwidth allocation request via one of the interfaces to request that the transfer rate from CI1 be limited to 5 Gbps within the group, from CI2 be limited to 2.5 Gbps within the group, and from CI3 be limited to 2.5 Gbps within the group (thus keeping the total limit 10 Gbps). In response to the bandwidth rate limits requested by the client for the group as a whole and/or for the individual resources, the resource manager may initiate network configuration changes at various devices and along various network paths in different embodiments to enforce the specified transfer rate limits across the various network links reachable from the resources of the group, e.g., by allowing transfers at up to the specified rates and by dropping packets or otherwise throttling traffic if the limits are exceeded. Configuration changes could be initiated or performed at various layers within the software stack (e.g., by changing settings within the virtualization layer, operating system settings, or application parameters) executing at the resources in some embodiments; in other embodiments network interfaces (physical or virtual) at the resources, as well as other network devices such as routers, gateways, switches, and the like, reachable by network links from the resources may be configured to implement the transfer rate limits or the limits may be a natural result of physical design limits of the devices or interface (e.g., a 10 Gigabit Ethernet network interface card is limited by the physical limitations of the transceivers to 10 Gbps). At least some of the devices at which configuration changes are made to implement the rate limit restrictions may be one or more network hops away from the resources of the group in some implementations (i.e., the devices being configured may not be directly attached to the resources whose traffic rates are to be controlled). In some embodiments, the limits may be different for "transmit" and "receive" traffic. It is noted that while in much of the following description, network traffic rates are used as the example resource capability for which various operations (such as determining pricing, distributing a total resource limit of a resource group among individual resources of the group, emulating circuit switching, or making placement decisions) are performed, in other embodiments techniques similar to those described with respect to network traffic rates may be applied with respect to other resource capabilities as well, such as network latency, resilience to faults or failures, and the like. In one embodiment, for example, networking-related pricing for a resource group may be based on any combination of traffic rates, latency, and ability to withstand a specified number of faults or failures. Similarly, in another embodiment, a resource placement request may specify inter-resource network latency requirements as the primary requirement, or a specified level of fault tolerance as the primary requirement, instead of network traffic rates.

In one embodiment, each resource (such as a virtual compute instance or a storage instance) could be assigned a default network traffic rate limit when it is instantiated for a client or acquired by the client, and the total traffic rate limit for a resource group may initially be derived based at least in part on the sum of the default rates assigned to the individual resources of the group. For example, in some implementations each compute instance may be classified (e.g., based on the speed and number of the CPUs or cores allocated to it, the amount of memory allocated to it, the type of network interface card assigned for its use, and so on) as a "small", "medium" or "large" instance, and respective default network traffic rate limits may be assigned for each of the three sizes. In one implementation, the resource manager may be configured to restrict the group traffic rate limit to no more than the sum of the limits (either the default limits, or non-default limits modified at the request of the client) of the individual resources within the group. E.g., if a resource group comprises three medium instances with individual rate limits of 2 Gbps, and the client attempts to set the group bandwidth pool rate to 7 Gbps, the resource manager may reject the request (whereas any requests for a group total traffic rate limit of 6 Gbps or less would be accepted). In another implementation, the group's total network traffic rate limit may be determined as the sum of the individual resources' limits; i.e., the client may be allowed to request a creation of a bandwidth pool, but the size of the pool may be determined, at least initially, by the individual rates of the group members. In some embodiments the total traffic rate assignable to a resource group may be settable at a higher or lower value than the sum of the rates of the individual resources of the group. If the client does not explicitly specify how the total network traffic rate of a resource group is to be distributed among the member resources of the group, the resource manager may distribute the total rate equally among the resources in one implementation, or based on a distribution policy agreed to by the client in another implementation (e.g., according to one such distribution policy, whenever the total traffic rate is increased for a group, fifty percent of the increase may be assigned to one resource designated by the client, and the remaining fifty percent may be distributed equally among the other resources of the group). In one embodiment, a request to create a bandwidth pool for a set of resources may serve as an implicit request to create a resource group, i.e., a resource group may not have to be explicitly created prior to requesting a bandwidth pool. Similarly, in some embodiments a request to create a resource group may serve as an implicit request to set up a bandwidth pool for the resources of the group, e.g., with a total network traffic rate set to the sum of the traffic rate limits of each of the member resources. As resources are dynamically added or removed from the resource group, the total traffic rate for the group may be adjusted accordingly in some embodiments, by increasing the group's total by the rate of the newly added resource, or decreasing the group's total by the rate of the newly removed resource.

In some embodiments, the resource limits may be relegated to a range of possible settings. The resource limit cannot become "negative" (i.e. go below zero) and likewise also cannot exceed the maximum available resources of the host. For example, consider the case where all servers participating in a resource group have 10 Gbps network interfaces. Even if a resource group had a total allocation of "12 Gbps" to distribute among instances operating within the group, no single host could accommodate a 12 Gbps throughput and at most a single instance could be assigned 10 Gbps of the allocation. Therefore, other constraints and limits may apply, and in some embodiments those limits will also be tracked and managed by a resource manager when determining allocations. Likewise, if resources are allowed to scale with relative allocations (e.g., CI1 gets 50% of the total allocation, C2I gets 30% and C3I gets 20%), depending on the total magnitude of the resource requests to the resource manager, these relative allocations may not be achievable. Using the previous example, if the total allocation is 20 Gbps, CI1 could be assigned 10 Gbps and CI2 6 Gbps and CI3 4 Gbps. However, if the total allocation was 30 Gbps, the only way to distribute all of the allocation to 3 instances would be 10 Gbps to each (i.e. 33% each instead of 50%, 30%, 20% respectively). In some embodiments, the resource manager may implement one or more constraint reconciliation policies (which may be specified by the client in some cases), that indicate how a hard constraint is to be reconciled against client requests or other constraints. In these or other embodiments, allocations may "oversubscribe" resources by assigning higher limits than can be supported, thereby relying on the default behavior dictated by the hardware. For example, suppose CI1 has a maximum physical capability of 10 Gbps but the resource manager decides to allow a maximum of 8 Gbps of bandwidth to either CI2 or CI3; if traffic is sent concurrently to both CI2 and CI3 at the 8 Gbps maximum, the hardware must take action to limit one or both traffic streams by discarding packets or throttling the 16 Gbps of aggregate traffic to the physical limit of 10 Gbps.

In at least some embodiments, clients may be allowed to create hierarchies of resource groups and associated bandwidth pools. For example, a client may request that a resource group K be formed by combining pre-existing resource groups A and B, where resource group A in turn already includes resource group C. In this example, a bandwidth pool for resource group K may be established by combining the bandwidth rate limits of its constituent resources and lower-level groups. In some embodiments, a client may provide guidelines or instructions to the resource manager as to how pre-existing bandwidth distribution policies for the lower-level groups should be combined to generate a composite bandwidth distribution policy for the newly created higher-level bandwidth pool. For example, in one embodiment, a bandwidth distribution policy for a resource group A (containing resources R1, R2 and R3) may indicate that 50% of the group's bandwidth rate limit be assigned to R1, and the remaining be distributed among other resources of the group A. Similarly, a bandwidth distribution policy in effect for a resource group B containing resources R4, R5 and R6 may specify that 80% of the group's total bandwidth rate limit be assigned to resource R4, with the remainder being divided among the remaining resources of group B. A client may create a composite resource group that combines groups A and B with another resource R7, and the policy combination guidelines provided to the resource manager may indicate, for example, that (a) 40% of the total bandwidth rate of all the resources be assigned to R7, 30% to resources of group A, and 30% to resources of group B and (b) within each group A and B, the new total bandwidth rate be distributed in accordance with the group's original distribution policy. In some embodiments, the "extra-group" policies of the lower-level group or groups may simply be directly inherited by the composite group as the "intra-group" policy of the composite group, and a new "extra-group" policy may be set for the composite group.

In at least some embodiments, a client may be allowed to request an increase to the network traffic rate limit of a particular resource of a group, and the resource manager may have to compensate for the increase by reducing the traffic rate limit for one or more other resources of the group. For example, in one scenario, the group limit may be 5 Gbps, and the three resources CI1, CI2 and CI3 forming the group may have rate limits set at 3 Gbps, 1 Gbps and 1 Gbps. If a client wishes to increase the traffic rate limit for CI1 to 4 Gbps, while keeping the group total rate at 5 Gbps, the resource manager may reduce the limits for CI2 and CI3 to 0.5 Gbps each, e.g., by initiating the required configuration changes at CI2 and CI3 and/or at appropriate networking devices. Various different compensation policies may be implemented for traffic rate limits in different embodiments, governing whether and how traffic rate limits may be reduced for some resources when those of other resources are increased. Similar policies may also be applied when traffic rate limits are decreased for a resource in some embodiments—i.e., to keep the total for the group unchanged, the traffic rate for other resources may be increased.

The resource manager may provide support for one or more types of special-purpose resource groups in some embodiments. For example, "cluster placement groups" with special networking topologies may be supported for high-performance applications in some embodiments. Special compute instances (which may be called "cluster instances") with large numbers of fast CPUs and/or graphics processing units (GPUs) may be acquired by clients to populate such cluster groups, and the network interconnects and topologies for intra-cluster communication may support full bisection bandwidth (i.e., if the cluster has N nodes, then the sum of the link bandwidths between any two halves of the network is N/2 times the bandwidth of an individual node). A client may request the establishment of a cluster placement group in such embodiments, and populate the group with cluster compute instances. The client may then specify the total transfer rate for the placement group, and allocate portions of the total to the individual cluster instances, as desired.

For at least some types of applications, the network traffic flow needs for different resources participating in the application may vary. For example, in some distributed applications, one node of a resource group comprising a plurality of compute instance nodes may be designated as a "head node" responsible for receiving compute jobs from one or more external job submitters, and for distributing the compute jobs for execution by some set of "worker nodes" or "slave nodes" of the resource group. A job may, for example, specify an executable component (such as a compiled program or a script) as well as a data set to be read/manipulated by the executable component. Once a worker job receives a compute job, it may execute the job for a while, and may not have substantial network traffic needs while the compute-intensive portions of the job are performed. The head node may also be responsible for collecting job results and distributing the results to various external destinations. Accordingly, the network usage profile of a head node may be very different from that of worker nodes, and at least in some embodiments and for some types of applications, it may be useful to set the network transfer rate limits for a head node higher than the transfer rate limits for the worker nodes. Similarly, for other applications, it may be useful to designate one particular node as a "group gateway" responsible for funneling traffic to destinations outside the group, and/or for receiving incoming traffic from outside the group. For example, one compute instance of a first resource group of compute instances may be designated as a gateway for network traffic between the first group and a second resource group comprising block storage devices used for storing input and/or output data for computation jobs performed within the compute instances of the first resource group. Group gateway resources may also be assigned different transfer rate limits than other resources of the group in some embodiments. In some embodiments, where for example all the resources of a particular resource group reside within a particular data center or a particular "availability zone" (i.e., a collection of platforms for hosting resources, engineered to have availability profiles such that equipment failures do not cascade across availability zone boundaries, as described below in further detail), a group gateway resource may be designated for traffic to other data centers or availability zones of the provider network, and/or to networks outside the provider network (such as client networks or the public Internet). Traffic rate limits for the group gateway resource may be set to different values than for other non-gateway resources. In some embodiments, as described below in further detail, clients may specify rate limits for traffic along specific network routes (e.g., a client may indicate that a 1 Gbps rate limit should be set for a route between resources R1 and R5 via a route that includes resources R2, R3 and R4).

In one embodiment, the resource manager may implement a plurality of pricing policies for network traffic, and a client may be able to choose the type of pricing plan to be used for their resource groups. In some implementations a pricing manager subcomponent of the resource manager may be responsible for determining the prices associated with different pricing policies, communicating price changes and policy changes, determining billing amounts based on pricing policies selected by clients, and other pricing-related functions. An interface manager subcomponent of the resource manager may implement one or more programmatic interfaces allowing a client to select a pricing policy from among several supported bandwidth pricing policies for a particular resource group comprising a plurality of resources of the provider network allocated to the client. Each pricing policy may include one or more pricing components based on different combinations of characteristics of the traffic being priced, such as whether all the resources of the group are to be treated identically with respect to pricing or not, whether different rates are to be applied to intra-group traffic versus extra-group traffic, whether traffic is to be dynamically priced or fixed prices are to be used, and so on. For example, in one embodiment, a particular pricing policy may include a first pricing component based at least in part on an intra-group network traffic rate between the resources of a resource group, and a second pricing component based at least in part on extra-group network traffic rate. The extra-group traffic rate may be further specified as the traffic between a gateway resource of the resource group, specified by the client, and network destinations or sources external to the resource group. At designated billing intervals, the resource manager may provide one or more billing amounts or statements to a client based on the client's selected pricing policy and network traffic metrics collected for the resources of the group. Unlike some conventional bandwidth pricing approaches, in which the bandwidth billing may be based on the total amount of data transferred (e.g., a billing amount in one scenario may be a linear function of the number of gigabytes network transmitted from or to a resource over a billing period) or on the number of network read (or "get") and write (or "put") operations, at least some of the pricing policies used in different embodiment may be based on traffic rates (e.g., a billing amount may be determined by the fastest traffic rate measured from or to a given resource or resource group, or on the average, or on the $90^{th}$ percentile of the peak traffic rate). Some pricing policies may include pricing components on several metrics, such as traffic rates, latency of individual network packets within a flow, total traffic transmitted, and/or total number of network operations, in one embodiment.

As mentioned above, pricing policies for resource group bandwidth usage may be classified along several dimensions in some embodiments. One classification dimension may reflect the time periods for which a particular price is to apply. For example, in one embodiment a dynamic spot-pricing model may be supported, in which clients submit bids for network traffic rates in various portions of the provider network. Each client specifies in its bid the maximum price that the client is willing to pay (e.g., per Gbps or per Mbps for a requested rate, or per Gigabyte for a total transfer size), and the resource manager may set a spot price for a given subset (such as a collection of data centers) of the provider network based on the prices clients are willing to pay and on the state of the network. In some embodiments the state of the network may be determined based on metrics collected by the resource manager, and its knowledge of the hardware capabilities of various network devices and links. In some implementations the resource manager may also use predictive models of anticipated future bandwidth usage to help determine the spot price (e.g., by analyzing past usage patterns of customers, instances with the same or similar virtual machine images, and the like). If a client's bid meets or exceeds the current spot bandwidth price, the client may be allowed to transmit network traffic at the requested rate. If the spot price rises beyond the bid submitted by the client, the client's spot resource allocation may be revoked and traffic may be throttled to a lower rate. In general, the spot bandwidth price may vary with demand and supply, and it may not always be easy to predict the spot bandwidth price far in advance. In some embodiments, for greater predictability, bandwidth may also or instead be priced using a long-term reservation model, in which, for example, a client pays an upfront reservation fee for a specified traffic rate, and then is allowed to transmit/receive traffic at up to that specified rate for a designated reservation term (which could be hours, months or even years, depending on the needs of the client and the particular long-term reservation policy implementation). Clients that are unwilling to pay the upfront fee, and are also interested in greater predictability than afforded by spot pricing, may be able to select an on-demand pricing policy in some embodiments, according to which clients are allowed to transmit/receive data at up to a specified transfer rate for a fixed price for at least a specified time interval. In some embodiments a time-window based pricing policy may also be supported, according to which the price for a given rate of traffic may be different for different times of day or different days of the week—e.g., a low price may apply for a period between 11:00 PM and 7:00 AM, and a higher price may apply between 7:00 AM and 11:00 PM for the same traffic rate. Thus, in the timing-window model, the price for the same traffic rate (and between the same resources or resource groups) may differ based on when the traffic occurs; such a model may be very helpful to clients that can delay large data transfers until an inexpensive time window, for example. Various combinations of spot pricing, long-term reservation based pricing, on-demand pricing and time-window based pricing may be made available to clients in some embodiments, and each pricing model may involve specific pricing that can be set or dropped to zero—i.e. becomes "free" under certain conditions. For example, in one embodiment, intra-group traffic may be provided free of charge with rental of other resources such as the compute instances themselves, while extra-group traffic is billed at a non-zero rate.

Pricing may also differ for different source-destination combinations in some embodiments. For example, in one embodiment, one pricing component or policy may apply to intra-group traffic, a second component to inter-group traffic between resource group at a given data center or availability zone, a third component to inter-group traffic between different data centers or availability zones of the provider network, and a fourth component to traffic between a resource group and a destination (or source) outside the provider network, such as in a client network reachable via the public Internet or via a third-party network. Furthermore, in some embodiments, different pricing terms may apply to incoming and outgoing traffic with respect to a given resource. In one embodiment, the pricing applied to traffic from or to a designated set of group gateway resources (such as a head node of a cluster resource group) may differ from the pricing applied to other, non-gateway resources of the group. A client may be allowed to select independent combinations of different pricing policies for the different source-destination types in some embodiments—e.g., a long-term reservation policy may be selected for inter-group traffic, while an on-demand or spot pricing model may be used for traffic from a designated group gateway resource to an external destination (or from an external source).

In some embodiments, when a client wishes to increase the traffic rate limit for a resource group or an individual resource, the client may select from among various policies available for pricing the increase. For example, in one embodiment, a client may set up a bandwidth pool for a resource group, specifying a total traffic rate limit for the group as a whole, and distribute that total traffic rate among the individual resources as desired. If the client later submits a request to increase the traffic rate limit for a particular resource of the group, the resource manager may first attempt to determine whether the requested increase can be compensated by decreases to the rate limits of other resources of the group based on a previously specified or default compensation policy, so that the total rate limit for the group does not have to be increased. If the resource manager determines that the total limit does have to be increased (e.g., because the current limit for each of the other resources is already as low as it can be set, according to a minimum rate requirement in effect for the resources of the group), the client may be billed for the increase in traffic rate based on a pricing policy selected by the client and on the amount of the increase. If the increase can be compensated for by decreasing the rate limits of one or more other resources, the resource manager may implement such decreases in accordance with a bandwidth compensation policy agreed to by the client in some embodiments. In some implementations, the client may select one pricing policy (e.g., a relatively inexpensive reservation-based fee) for an initial or baseline traffic rate for a resource or a resource group, and a different pricing policy for traffic that exceeds the initial traffic rate (e.g., a spot or on-demand policy).

The resource manager may support emulation of circuit switching among resources of the provider network in some embodiments. A client may submit a circuit switching emulation request to the resource manager in one such embodiment, specifying endpoints of the desired emulated circuit, and a desired network transmission rate to be supported between the endpoints. At least one of the endpoints may comprise a resource group containing at least one resource allocated to the client in some embodiments. The resource manager may determine, e.g., using its knowledge of the hardware and software networking capabilities of various network devices and links of the provider network, whether a path that can support the desired traffic rate can be established, e.g., using bandwidth capacity set aside exclusively for the client's traffic between the endpoints. In response to a determination to accept the circuit emulation request, the resource manager may initiate configuration operations associated with a network path between the endpoints to allow network traffic between the endpoints at a rate up to the desired network transmission rate in some embodiments, and may inform the client that the requested circuit switching has been emulated. In some embodiments bandwidth capacity may be reserved exclusively for the client as a result of some of the configuration changes—e.g., after the configuration changes, no other traffic from other clients may be transmitted over one or more dedicated paths, even if the client for whom the circuit is emulated does not generate traffic at least temporarily. If the resource manager determines that such a network path cannot be established, it may notify the client that the circuit switching emulation request has been rejected. The emulation requests may be rejected for any of a number of reasons in different embodiments—e.g., based on the resource manager determining that a bid amount specified in the request is insufficient, based on current or anticipated traffic rates, or based on the duration for which the client is requesting the circuit emulation.

If, after the emulated circuit has been configured, the resource manager detects (e.g., based on metrics collected along a path between the endpoints) an attempt to exceed the requested traffic rate, the resource manager may throttle the traffic, e.g., by dropping network packets in some embodiments. In one embodiment, the client may provide some guidance about the path to be established for the emulated circuit, e.g., by specifying characteristics of a desired network route between the endpoints (such as one or more routing table entries). The circuit switching emulation functionality of the resource manager may include several features similar to those described earlier for resource group traffic rate limit functionality and pricing in some embodiments—e.g., designated group gateway resources may be indicated for one or both endpoints of a circuit, different traffic rates may be specified for traffic in the two different directions between the endpoints, programmatic interfaces may be provided for circuit switching emulation requests, various pricing policies may be applied based on client preferences for traffic between the endpoints, and so on. Circuit switching emulation may be particularly useful in environments where specific types of application architecture are prevalent—e.g., according to one application architecture, one group of compute resources (where the group size may vary over time) is expected to have to transfer significant amounts of application data to or from a second, potentially remote group of storage resources (whose size may also vary over time). In some implementations, the two resource groups connected as a result of a circuit switching emulation request may be resident at different data centers or in different availability zones or regions, depending on the goals or policies specified by the user (e.g., site resiliency).

The resource manager may, in many embodiments, have access to various details of the provider network layout and architecture that are typically not made available to clients (e.g., the physical locations of the platforms used for various resources, such as rack servers, storage arrays and the like, and the features and capabilities of the network devices such as switches and routers that can be used to provide connectivity among the various resource). If a client submits resource allocation requests for one resource at a time, or for a small set of resources at a time, the resource manager may select the platforms used for those resources using some set of heuristics (e.g., to try to balance the load among various platforms and among various parts of the provider network to provide single fault resiliency while minimizing network link usage) that do not specifically take the client's application architecture or application networking needs into account. Accordingly, in at least one embodiment, a resource manager may provide support for resource placement requests in which clients are allowed to specify various types of requirements for a potentially large set of resources at a time, including bandwidth rate requirements between specific pairs of resources. The resource manager may be able to optimize the placement of the requested resources based on its knowledge of the network in such an embodiment—e.g., if the placement request specifies requirements for sixteen compute instances of a desired performance capability, and a desired traffic rate between each pair of the resources, the resource manager may be able to use a single server rack (with access to a high-performance network switch) for all sixteen instances, instead of distributing the instances across various racks, as might have been the case if the requests for the resources were received individually. In some embodiments, other constraints such as desired "resiliency to single fault" or latency between instances may be specified by a client and accounted for in the placement strategy by the resource manager.

In one such embodiment, a resource placement request submitted via a programmatic interface implemented by the resource manager may comprise a plurality of resource pair specifications, where each resource pair specification indicates a first desired capability of a first resource to be identified for the client, a second desired capability of a second resource to be identified, and a desired network transmission rate to be supported between the first and second resources of the resource pair. Resource pairs may be arranged hierarchically in some placement requests—e.g., in a tree structure such as a spanning tree representation of the client's desired network in one implementation. Various types of desired capabilities may be specified for the resources in different embodiments, such as a desired compute performance, memory size, storage size, software stack (e.g., operating system and/or installed applications), availability or fault tolerance, and so on. In addition, in some embodiments additional networking preferences may also be specified, such as desired network latency, preferred network routes between the various resources, and so on. In response to the placement request, the resource manager may attempt to identify resources that have the specified capabilities, and can be linked by a network path supporting the desired traffic rates. In some embodiments, if a set of resources with the desired capabilities and connectivity can be found, the resource manager may submit a resource acquisition plan to the client. The plan may include, for example, the estimated price for allocating all the resources of the various resource pairs and the network paths between the resources, so that the client may decide whether the resources should be acquired or not. If the client finds the acquisition plan acceptable, the client may submit a plan implementation request to the resource manager in some embodiments, and the resource manager may acquire the resources and initiate the necessary networking-related configuration operations to support the desired traffic rates. In other embodiments, the resource manager may simply allocate the resources identified and/or initiate the configuration changes needed to enforce the network traffic rates to be supported, without requiring additional interactions from the client beyond the initial placement request. If a set of resources with the desired capabilities cannot be found, the resource manager may inform the client that the placement request cannot be satisfied.

Example System Environment

FIG. 1 illustrates an example system environment, according to at least some embodiments. The system 100 comprises a provider network 110 with a plurality of resources 130, such as resources 130A, 130B, 130C, 130K, 130L, 130P, 130Q, 130R and 130S, and a resource manager 180. The resource manager 180 may comprise a number of subcomponents in the depicted embodiment, such as an interface manager 185, a pricing manager 184, a metrics collector 183, and a placement optimizer 182. In at least some embodiments, a plurality of computing devices may be used to implement the resource manager—e.g., some or all of its constituent elements may be distributed across more than one device across a network. The resource manager 180 may be operable to receive and respond to various types of requests from clients 148 (e.g., 148A and 148B), such as bandwidth management requests of the types described below, as well as reservation, allocation, and instantiation requests for compute resources, storage resources and the like. The resource manager 180 may use a persistent storage repository such as resource management database 190 in some embodiments to store various types of metadata needed to respond to client requests. In some implementations the resource management database 190 may also be used for data collected on the state of the provider network such as resource usage metrics (including network usage metrics) collected by metering agents 140 that may be implemented at various locations of the provider network 110. The resources 130 may include, for example, various types of virtual or physical compute instances, storage instances, network devices and the like. Some of the resources 130 may be organized into client-defined resource groups in the illustrated embodiment—e.g., resource group 120A may include resources 130A, 130B and 130C, while resource group 120C may include resources 130S and 130L. In the depicted embodiment, some resource groups may include other resource groups—e.g., resource group 120B may include resource group 130C, as well as resources 130R and 130K. Other resources, such as 130P and 130Q may not belong to a client-defined resource group. Clients may wish to organize resources 130 into resource groups 120 for a variety of reasons in different embodiments, e.g., for specifying and distributing bandwidth rate limits on a group basis as described below, for mapping subsets of a client's resource fleet to respective business goals performed using those resources, for billing-related purposes, or simply for organizational purposes.

In some embodiments the provider network 110 may be organized into a plurality of geographical regions, and each region may include one or more availability zones. An availability zone in turn may comprise one or more distinct locations or data centers in some embodiments, while in other embodiments, a single data center may include portions of several availability zones. (For clarity, regions, availability zones and data centers are not shown explicitly in FIG. 1.) Availability zones may be engineered in such a way that the resources in a given availability zone are insulated from certain kinds of failures in other availability zones. That is, a failure in one availability zone may not be expected to result in a failure in any other availability zone; thus, the availability profile of a resource is intended to be independent of the availability profile of a resource in a different availability zone. Clients may be able to protect their applications from failures at a single location by launching multiple application instances in respective availability zones. At the same time, in some implementations, inexpensive and low latency network connectivity may be provided between resource instances that reside within the same geographical region (and network transmissions between resources of the same availability zone or same data center room or same rack may be even faster, have lower latency or higher throughput at lower cost). Some clients may wish to specify the locations at which their resources are reserved and/or instantiated, e.g., at either the region level, the availability zone level, or a data center, or even room or rack level, to maintain a desired degree of control of exactly where various components of their applications are run. Other clients may be less interested in the exact location where their resources are reserved or instantiated, as long as the resources meet the client requirements, e.g., for performance, high availability, bandwidth rates, latency, cost, sovereign compliance requirements (i.e., a legal requirement that the service must operate within the borders of a particular country), supported software levels, and so on.

In the depicted embodiment, the interface manager 185 may be responsible for implementing one or more programmatic interfaces (e.g., API sets, web pages, command-line tools, and/or GUIs of various types) usable for client interactions 194, such as client requests to create bandwidth pools, bandwidth pricing policy selections by clients, circuit switching emulation requests, and placement requests, each of which will be described in further detail below. Pricing manager 184 may be responsible for implementing various pricing policies supported in system 100 for bandwidth and/or other resources, e.g., by adjusting dynamic bandwidth spot prices up or down based on bids received from clients 148, responding to queries for pricing history and/or billing history, and so on. Unlike some conventional bandwidth pricing policies in which price is determined based on the total amount of data transferred, or on the number of network operations, at least some of the pricing policies implemented by pricing manager 184 may generate billing amounts based on the rate of network traffic from or to client resources (e.g., the maximum rate, or the average rate, over a time period). Metrics collector 183 may be responsible for obtaining resource metrics (e.g., CPU utilization, network traffic rates, network congestion information such as dropped packet rates, packet latencies, retransmission rates and the like) from various resources 130, for use by other components of the resource manager 180 to respond to client requests and queries, and also to help initiate corrective actions if problem situations such as suspected denial-of-service attacks or network partitions are detected. Placement optimizer 182 may be responsible for identifying the most appropriate locations or platforms (e.g., specific physical servers, server racks, data center rooms, and the like) for compute and storage resources requested by clients, based for example on the networking needs specified by the clients and on the networking infrastructure (e.g., switches, routers, gateways, physical network links and the like) of the provider network 110. In some embodiments, the functionality of one or more of the subcomponents of resource manager 180 may be provided by a standalone entity separate from the resource manager; e.g., a separate interface manager may be implemented in some embodiments. The resource manager 180 may include other subcomponents (e.g., a separate billing manager responsible for generating billing statements for clients) not shown in FIG. 1 in at least some embodiments. Portions of the resource manager functionality may be implemented by modules resident on various resources within provider network 110 in some embodiments, e.g., configuration operations that may be required for implementing traffic rate limits may be performed by resource manager modules incorporated within compute instances, network devices such as switches, gateways and the like.

Clients 148 may submit bandwidth pool creation requests for resource groups 130 to the resource manager 180 in some embodiments, e.g., using an interface implemented by the interface manager 185. If the resource manager 180 decides to accept a pool creation request, it may store an indication of the total network transfer rate limit for the group as a whole in some embodiments, e.g., within database 190. The total network transfer rate limit may be explicitly specified in the pool creation request in some implementations, and may be determined by the resource manager (e.g., based on the individual rate limits of the resources 130 of the group 120) in other implementations. In response to a bandwidth allocation request from the client 148 to allocate a specified portion of the total network transfer rate limit to a particular resource 130 of the group 120, the resource manager may initiate one or more configuration changes to allow network transmissions within one or more network links of the provider network 110 accessible from the particular resource 130 at a rate up to the specified portion in the depicted embodiment. Various other features of the resource manager's functionality regarding bandwidth pool setup and distribution of the group's total transfer rate among individual resources are described in further detail below. These additional features may require policies or other data that may also be stored in various forms in the database 190.

In some embodiments, the pricing manager 184 of resource manager 180 may implement several different policies or approaches for bandwidth pricing. In one such embodiment the interface manager subcomponent 185 of the resource manager 180 may implement a programmatic interface allowing a client 148 to select a respective pricing policy (from among the plurality of bandwidth pricing policies supported) for each of various resource groups 120 of the client. In some implementations each pricing policy may include one or more pricing components usable to determine billing amounts based on one or more respective characteristics of the network traffic associated with the resources 130 of the resource groups 120. One pricing policy may, for example, include a first pricing component based at least in part on an intra-group network traffic rate between the resources of a given resource group 120 and a second pricing component based at least in part on an extra-group network traffic rate between the given resource group and one or more external network destinations or sources. Traffic to or from the external destination may be routed through a designated gateway resource 130 specified by the client in some embodiments, i.e., the extra-group pricing may apply specifically to network traffic to or from the specified group gateway resource. Various combinations of pricing policies, such as dynamic spot pricing, long-term reservation-based pricing, on-demand pricing, and time-window based pricing, illustrated in FIG. 9, may be selected by the client 148 in some embodiments for different types of source and destination sets—e.g., spot pricing may be selected for incoming and outgoing traffic from one resource group 120A to another resource group 120B, while long-term reservation based pricing may be selected for traffic along paths that are expected to require substantial data transfers over long periods of time. Additional details regarding pricing functionality of the resource manager 180 are provided below in conjunction with the description if FIGS. 9, 10 and 11.

The resource manager 180 may support emulation of circuit switching for the resources 130 of the provider network 110 in some embodiments. That is, the resource manager may attempt to ensure that a desired traffic rate is supported, at least in some implementations with bandwidth capacity exclusively set aside for the client, between specified endpoint resource groups (or individual resources) for as long as the client wishes. In one such embodiment, a client 148 may submit a circuit emulation request to the resource manager 180, specifying a first resource group (e.g., 120A) and a second resource group (e.g., 120B) and a desired network transmission rate to be supported between the first and second resource groups. In response, the resource manager 180 may look up network infrastructure details such as the rated bandwidths of one or more alternative network links available between the resource groups, the current level of traffic (or congestion) at various portions of the network, and so on, to determine the likelihood of being able to sustain the desired traffic rates. In response to a determination to accept the circuit switching emulation request, the resource manager 180 may initiate one or more configuration operations associated with a network path between the first and second resource groups 120 to allow network traffic between the first and second resource groups at a rate up to the desired network transmission rate. Further details regarding the resource manager's support for circuit switching emulation are provided below in conjunction with the description if FIGS. 12, 13, 14 and 15.

In at least one embodiment, the resource manager 180 may be configured to determine optimized mappings of resources to underlying platforms of the provider network 110 based on client-specified per-resource capability requirements and requirements between pairs of resources. The placement optimizer 182 subcomponent of resource manager 180 may be responsible in one such embodiment for responding to client-submitted resource placement requests. A resource placement request may in such an embodiment comprise a plurality of resource pair specifications, where each resource pair specification indicates a first desired capability of a first resource, a second desired capability of a second resource, and at least one desired network capability (for example, pertaining to network fabric characteristics such as bandwidth, latencies or fault resiliency) to be supported between the first and second resources of the pair. Using information available to it regarding the locations of various resources, such as the types of servers and network equipment available at various data centers and availability zones, the resource manager 180 may determine whether resources matching the specific capability requirements can be allocated to the client 148. If the resource manager 180 is able to find resources that meet the desired capabilities, and can be linked by network paths that can support the desired traffic capabilities, the resource manager 180 may respond affirmatively to the client's resource placement request, indicating that desired resources can be allocated to the client 148. In some embodiments, before allocating the resources to the client, the resource manager may provide a pricing plan to the client, indicative of the cost of implementing the placement request, and the client 148 may decide to either proceed with the resource allocations, or abandon its request. Additional details on the resource manager's placement-related functionality are provided below in conjunction with the description of FIGS. 16, 17, 18 and 19.

Creation and Allocation of Bandwidth Pools

Figure 2:
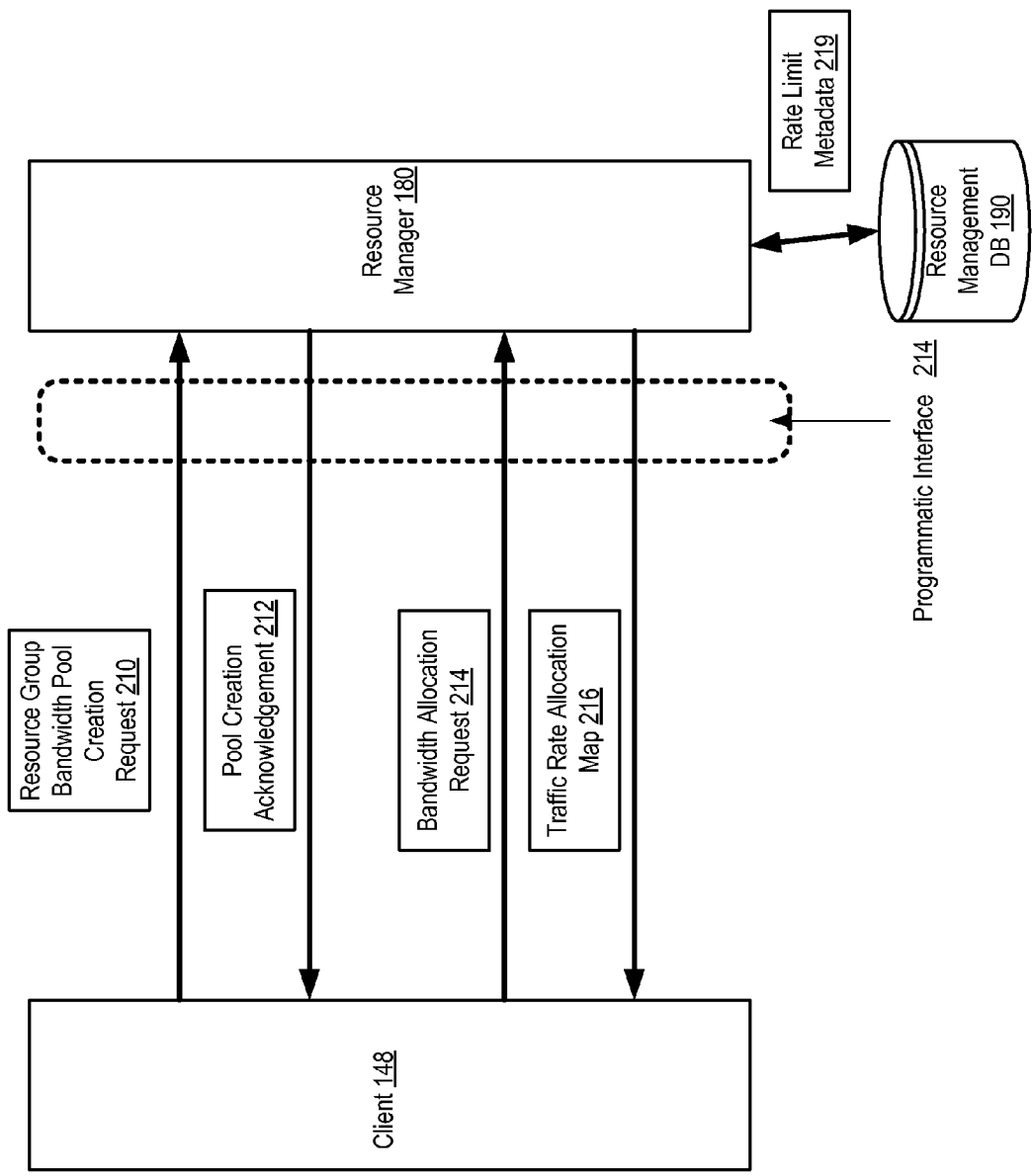
FIG. 2 illustrates examples of interactions related to bandwidth pool creation and distribution, between a client and a resource manager, according to at least one embodiment.

FIG. 2 illustrates examples of interactions between a client 148 and a resource manager 180 related to bandwidth pool creation and distribution, according to at least one embodiment. A client 148 may submit a bandwidth pool creation request 210 for a resource group 120 to the resource manager 180, e.g., via a programmatic interface 214 implemented by the interface manager 185. In some implementations, a bandwidth pool creation request 210 may be part of a resource group creation request, i.e., a client 148 may submit a request to set up a pool of bandwidth for a resource group 120 at the same time that the client-specified resource group 120 itself is created. In other implementations, the pool creation request 210 may refer to a previously-created resource group, e.g., by providing a resource group identifier. The pool creation request 210 may include an indication of the desired total network traffic capabilities to be supported for the group as a whole in some embodiments; in other embodiments, or if the total is not specified as part of the request 210, the resource manager 180 may compute the total based on the allocations currently assigned to the resources of the group. In some embodiments, allocations may not be assigned by default for various resources, and the client may have to make specific requests for each resource; in other embodiments, default allocations may be assigned to each resource 130 by the resource manager (for example, based on a previously specified or otherwise default policy), and the client may be allowed to change the allocations as needed. In response to the pool creation request, the resource manager 180 may in the depicted embodiment save a record of the capabilities or requested allocations of the pool, e.g., as part of allocation limit metadata 219 stored in resource management database 180. The resource manager 180 may send a pool creation acknowledgement 212 to the client 148, indicating that the requested pool has been created. As noted earlier, while many of the techniques described herein use bandwidth rates as the primary example of the type of resource capability for which various operations are performed, similar techniques may be applied with respect to other types of resource capabilities as well, such as network latency, resilience to faults or failures, and the like. In one embodiment, for example, networking-related pricing policies for a resource group may be based on any desired combination of bandwidth, latency, and ability to withstand a specified number of networking-related faults or failures. Similarly, in another embodiment, a resource placement request may specify inter-resource network latency requirements as the primary requirement, or a specified level of fault tolerance as the primary requirement, instead of network traffic rates.

Using network bandwidth rates as a specific example of a capability that may be of interest to a client 148 with respect to resource groups, the client may send a bandwidth allocation request 214 to the resource manager 180, indicating that a specified portion of the total transfer rate of the group 120 should be assigned to a specified resource 130. In response, in the illustrated embodiment, the resource manager 180 may initiate or perform one or more configuration changes to allow network transmissions within one or more network links of the provider network accessible from the specified resource at a rate up to the specified portion. Configuration changes may be initiated at any of various devices in some embodiments—e.g., in networking software settings within an operating system, hypervisor, or device drivers at the resource for which the limit is being set, at a network interface card, and/or at various network devices such as switches, routers, gateways and the like. In some embodiments the resource manager 180 may also initiate similar types of configuration changes when the total bandwidth rate for the pool is set, i.e., prior to the allocation of a portion of the total to a particular resource. In some embodiments, the resource manager may provide a traffic rate allocation map 216 to the client 148, indicating how the total network traffic rate limit of the pool is divided among the different member resources 130 of the group 120. A record of the updated per-resource limits of the group may also be stored in the database 190 some embodiments. In some implementations, clients 148 may specify per-resource traffic rate limits in the bandwidth pool creation request 210, instead of, or in addition to, submitting bandwidth allocation records 214 for individual resources later.

Figure 3A:
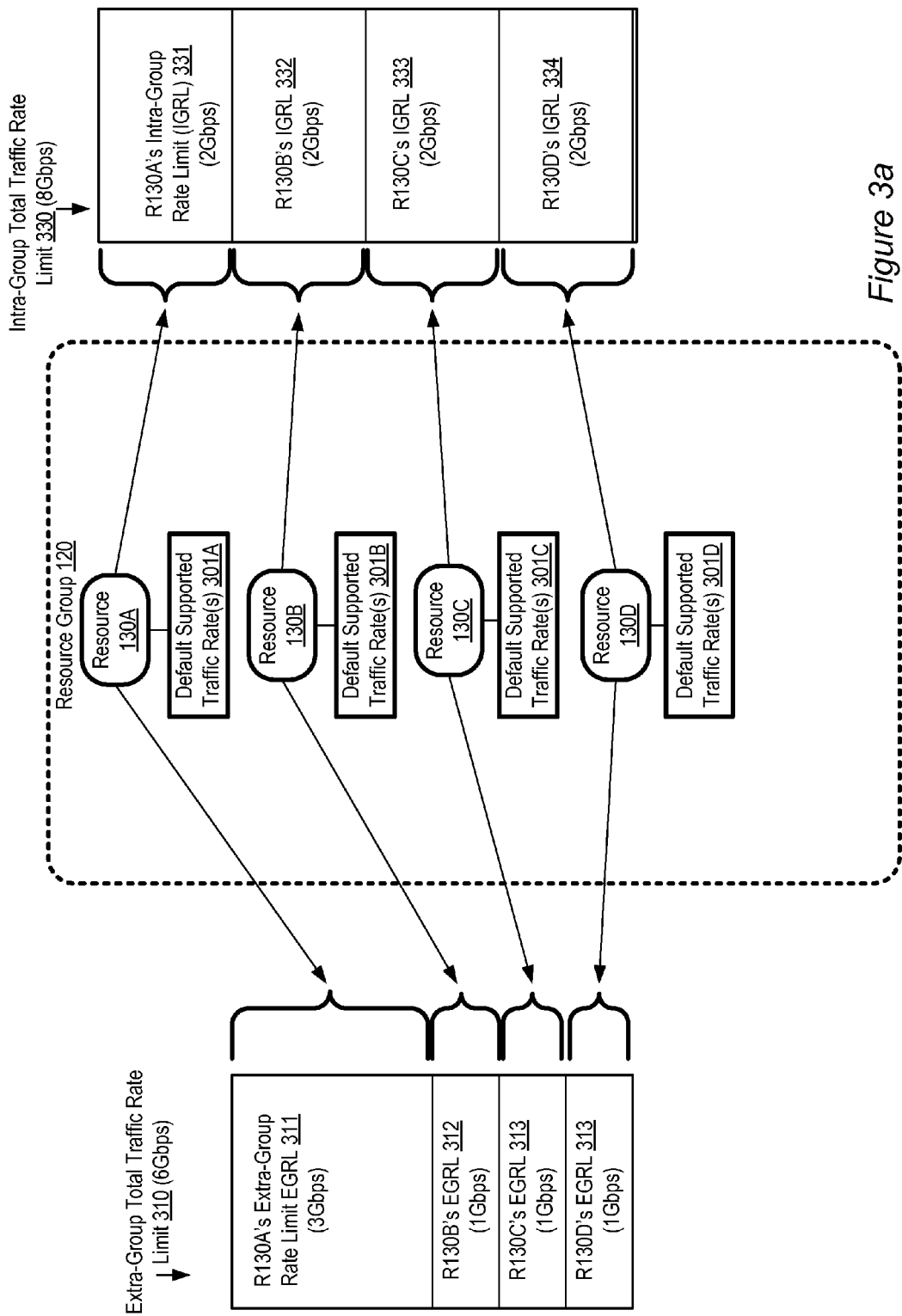
FIG. 3a illustrates an example of distribution of total traffic rates of two types of traffic of a resource group among the various member resources of the resource group, according to at least one embodiment.

In some embodiments, separate traffic rate limits may be set up for different types of network traffic, where the types of traffic may be defined at least in part based on the sources and destinations of the traffic. FIG. 3a illustrates an example of distribution of total traffic rates of two types of traffic of a resource group 120 among the various member resources of the resource group 120, according to at least one embodiment. In the illustrated embodiment, a resource group 120 comprises four resources 130A-130D. Each resource 130 has an associated set of default or nominal traffic rate limits 301 for two types of traffic—intra-group traffic (between the resources 130A-130D) and extra-group traffic (traffic to destinations, or from sources, outside the group 120). For example, resource 130A's default traffic rate(s) 301 may include one rate for extra-group traffic and another for intra-group traffic; the default traffic rate values may be based on factors such as the overall performance ratings of the resources 130 in some embodiments.

Two bandwidth pools, one or intra-group traffic and the other for extra-group traffic, have been set up in the depicted embodiment. The total traffic rate limit 310 for extra-group traffic is 6 Gbps, while the total traffic rate limit 330 for intra-group traffic is 8 Gbps. In some embodiments, the total traffic rate 310 for extra-group traffic may be set to the sum of the per-resource extra-group traffic rates by the resource manager 180, and similarly, the total intra-group traffic rate for the group may be set to the sum of the per-resource intra-group traffic rates. In the illustrated embodiment, for example, each resource 130A-130D may have contributed 1.5 Gbps of extra-group bandwidth capacity to the extra-group total of 6 Gbps, and each resource may have contributed 2 Gbps to the intra-group total of 8 Gbps. In embodiments where a default traffic rate (e.g., for intra-group traffic) is set for each resource 120, the default total traffic rate for the resource group 120 may be set initially to the sum of the defaults for the individual resources, e.g., prior to any specific allocation requests from the client. As a result of allocation requests from the client 148 to whom the resources 130 are allocated, the extra-group traffic rate limit of 8 Gbps in FIG. 3 has been distributed non-uniformly, such that resource 130A has a larger share (a 3 Gbps extra-group rate limit or EGRL) than any other resource (resources 130B, 130C and 130D each have a 1 Gbps EGRL). The intra-group traffic rate limit of 8 Gbps is divided equally among the five resources, with each resource assigned 2 Gbps as its resource-specific intra-group rate limit (IGRL). The client may dynamically modify the EGRLs and/or IGRLs of the various resources as needed in some embodiments. In some implementations, the client may also be able to increase the total rate limits for either of the two pools. In some implementations, the resource manager may attempt to compensate for a requested increase in the EGRL of one resource 130 by decreasing the EGRLs of one or more of the other resources in the group, and the same type of compensatory actions may be attempted for IGRLs. In at least some implementations, the traffic rate for a given resource may have a designated required minimum—e.g., the resource manager 180 may not be allowed to decrease the EGRL or IGRL of any of the resources 130 below 100 Mbps in one such implementation. Similarly, in some implementations each resource may have a specified maximum allowable traffic rate, based for example on the physical limitations of the networking equipment in use in the provider network 110. The resource manager may use a default or otherwise previously specified compensation policy to help reconcile conflicts or drive heuristics which take compensatory actions.

Figure 3B:
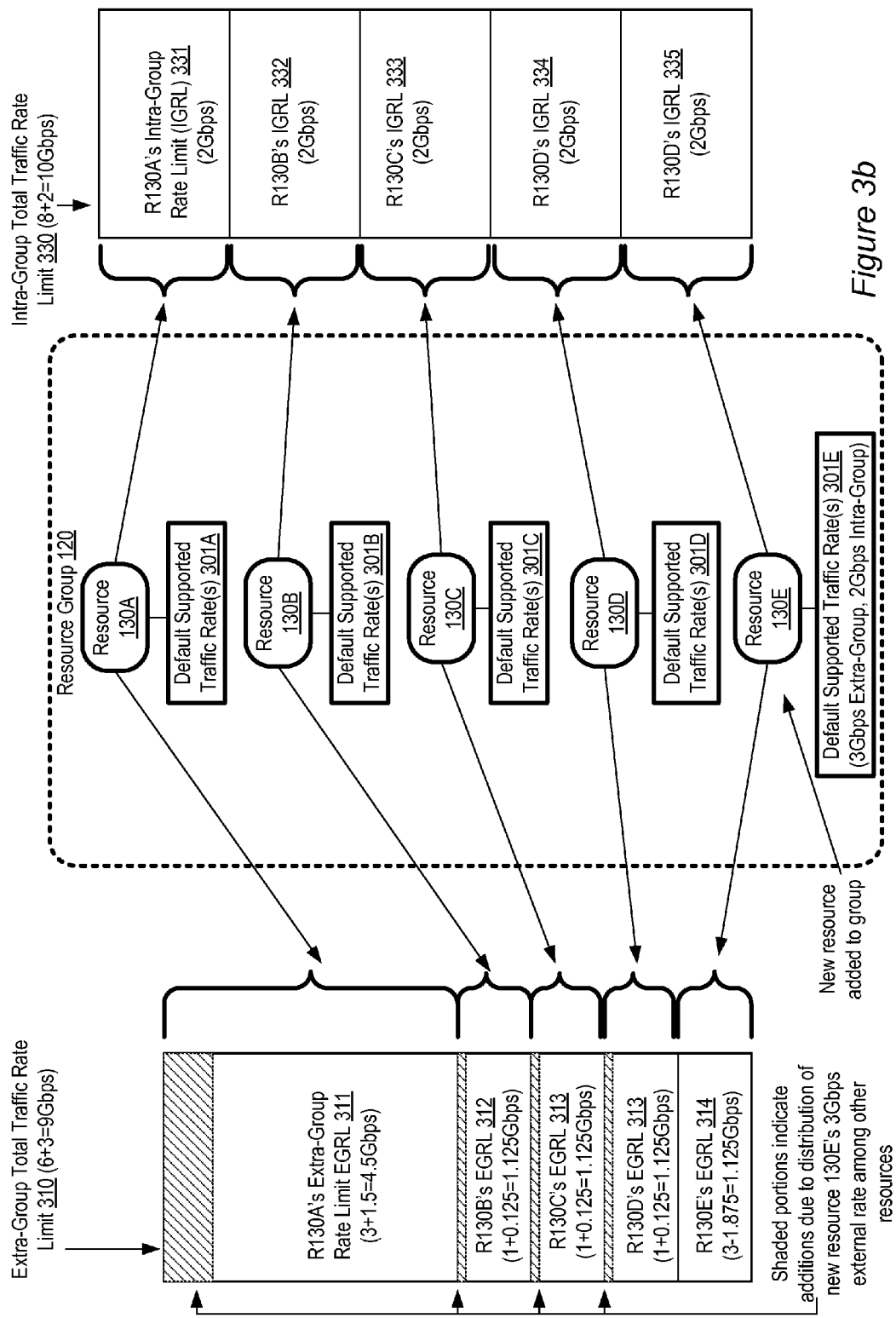
FIG. 3b illustrates an example of an addition of a resource to a resource group, and the impact of such an addition on the bandwidth rate limits of other resources of the group, according to at least one embodiment.

FIG. 3b illustrates an example of an addition of a resource 130E to a resource group 120, and the impact of such an addition on the bandwidth rate limits of other resources of the group, according to at least one embodiment. As shown, resource 130E may contribute an extra-group bandwidth rate limit of 3 Gbps to the total for the resource group 120, and contribute an intra-group bandwidth rate limit of 2 Gbps to the resource group. In accordance with a bandwidth redistribution policy in effect for the resource group 120 in the illustrated example, (a) 50% of the groups total extra-group bandwidth rate may have to be assigned to resource 130A, with the remaining portion split equally among the remaining resources and (b) the group's total intra-group bandwidth rate may have to be distributed equally among the member resources. Accordingly, after the inclusion of resource 130E, the extra-group bandwidth limit for resource 130A may be increases to 4.5 Gbps, and that for each of resources 130B, 130C and 130D may be increased to 1.125 Gbps. The increases in extra-group bandwidth limits that result from the addition of resource 130E are shown as shaded areas in FIG. 3b.

Figure 4A:
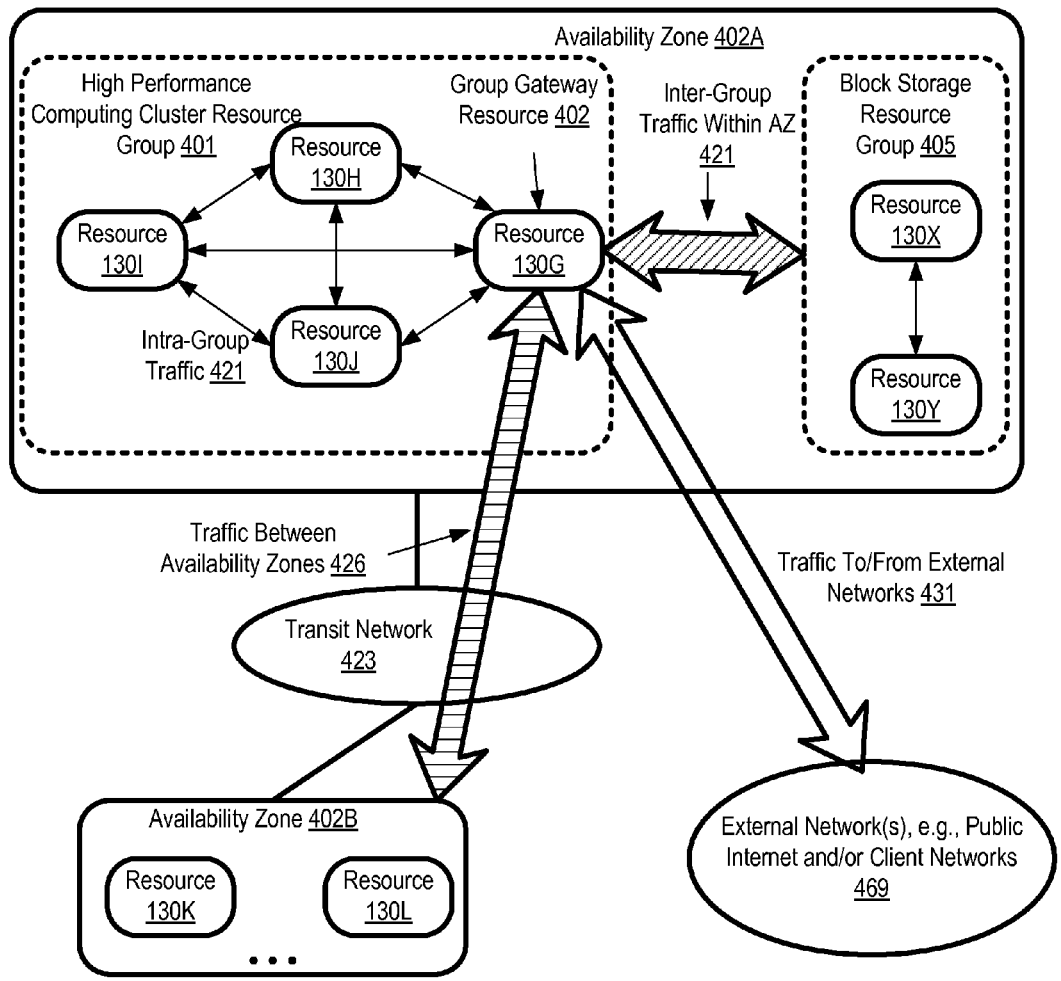
FIGS. 4a and 4b illustrate another example of a designation of different traffic rate limits for different source-destination combinations, according to at least one embodiment.
Figure 4B:
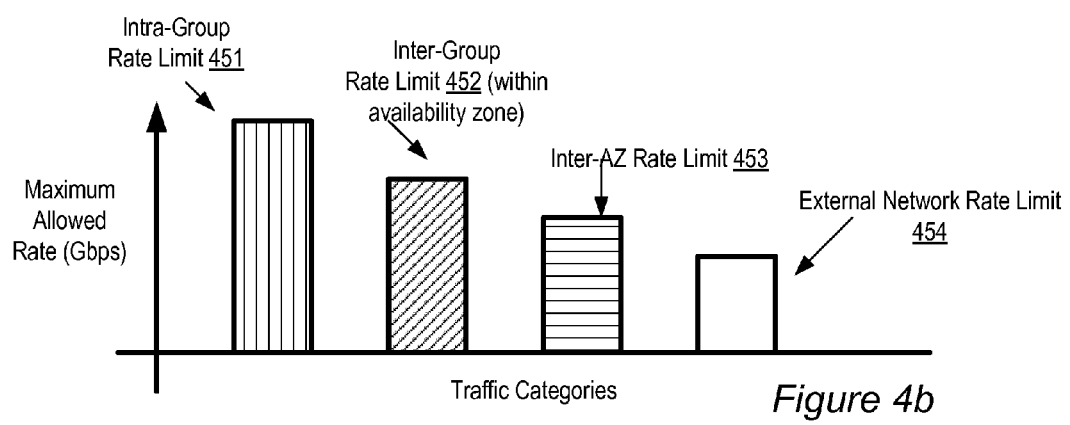

Continuing with the use of traffic rate limits as an example resource capability of interest, FIGS. 4a and 4b illustrate another example of a designation of different traffic rate limits for different source-destination combinations, according to at least one embodiment. Two resource groups are shown within an availability zone 402A (which may comprise portions of one or more data centers) of the provider network 110 in FIG. 4a. High performance computing (HPC) cluster resource group 401 includes four resources 130G, 130H, 130I and 130J. HPC cluster resources 130G-130JA may comprise, for example, virtual compute resources implemented using high-end CPUs and/or GPUs, connected to each other via a network fabric that supports full bisection bandwidth for the cluster. Block storage resource group 405 includes resources 130X and 130Y, at which at least some of the data manipulated by applications running on resources of the HPC cluster resource group 401 is stored. In the illustrated embodiment, different traffic rate limits, shown in FIG. 4b, apply to four different types of network traffic for the HPC cluster resource group 401.

Intra-group rate limit 451 of FIG. 4b applies to intra-group traffic 421. i.e., to network data that flows between the member resources 130G-130J of HPC resource group 401. For network data transmitted to, or received from, devices other than the member resources of group 401, resource 130G has been designated as a group gateway resource 402—that is, in the illustrated embodiment, traffic flowing to external destinations from any of the resources 130H, 130I, 130J (and 130G itself) flows through resource 130G, and traffic originating outside the resource group 401 and targeted at any of the resources 130G-130H is also routed through the designated group gateway resource 130G. (It is noted that group gateway resources, specified by clients for their resource groups in some embodiments, differ from other more conventional network gateway devices used for example to connect portions of the provider network to the public Internet, or to third party networks.) The external traffic handled by the group gateway resource 130G may be further divided into three categories. Inter-group traffic 421 within availability zone 402A, e.g., between resource groups 401 and 405, has its own rate limit 452. Traffic 426 between different availability zones of the provider network, e.g., between availability zones 402A and 402B (which includes resources 130K and 130L) via a transit network 423 may have its own inter-availability-zone traffic rate limit 453 in the illustrated embodiment. Transit network 423 may be owned or managed by the operator of provider network 110 in some embodiments. The client 148 to whom resources of group 401 have been allocated may also have allocated resources such as 130K and 130K at other availability zones in some embodiments, and may have set up resource groups at the other availability zones. (In some implementations, the provider network may be willing to reveal at least some resource location details to clients 148, e.g., by identifying at which data center a particular resource 130 is currently located. In such embodiments, different traffic rates may be applied for traffic between data centers, for example. The mapping between availability zones and data centers may vary in different embodiments—some availability zones may span multiple data centers, some data centers may host multiple availability zones, or a one-to-one mapping may exist between availability zones and data centers). Finally, for traffic 431 to/from external networks 469 outside the provider network, such as client-owned networks or other destinations reachable via the public Internet or via third-party networks, yet another traffic rate limit 452 may be designated for resource group 401 in the depicted embodiment. As indicated in FIG. 4b, different rate limits for resource group 401 as a whole may be set for each of the four traffic categories illustrated in FIG. 4a in some embodiments; that is, in effect, different bandwidth pools may be created for each of the traffic categories. In one embodiment, different per-resource rate limits may be assigned for each traffic category as well. It is noted that group gateway resources may not be designated for some or all resource groups 130 in various embodiments; in such embodiments, extra-group traffic may flow to or from any desired member resources 120 of a group.

Figure 5A:
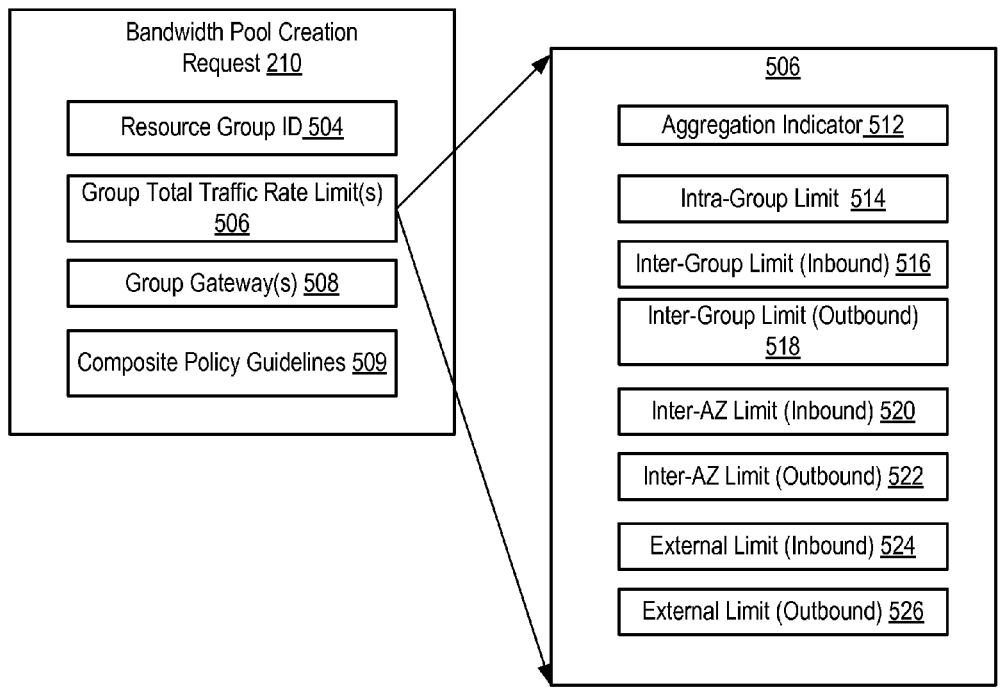
FIG. 5a illustrates example constituent elements of a bandwidth pool creation request, according to at least one embodiment.

FIG. 5a illustrates example constituent elements of a bandwidth pool creation request 210, according to at least one embodiment. As shown, the pool creation request 210 may include an identification 504 of the resource group 120 for which the pool is being created. In addition, at least in some embodiments the pool creation request 210 may include a set of one or more group total traffic rate limits 506. In some embodiments, where for example default traffic rates are assigned to resources 130 (such as default rates 301 shown in FIG. 3), the pool creation request 210 may include an aggregation indicator 512 allowing the client to specify whether the resource manager 180 should sum up the current (default or non-default) traffic rate limits of the member resources 130 of the resource group to arrive at the total rate limits for the group. If aggregation-based determination of group total rate limits is not desired or supported, the client may specify group total rate limits for a variety of different types of traffic in the depicted embodiment. For example, an intra-group rate limit 514 may be specified for traffic between the group members, and separate inbound and outbound traffic rate limits may be specified for inter-group traffic (elements 516 and 518 of FIG. 5a) within an availability zone or data center, inter-availability-zone traffic (elements 520 and 522), and external traffic to or from entities outside the provider network (elements 524 and 526). The pool creation request 210 may include an identification 508 of one or more group gateway resources through which traffic to or from outside the resource group is to be routed on behalf of the other resources of the group; in other embodiments group gateway resources may not be designated, and traffic may flow to or from external endpoints through any or all of the group's resources. In some embodiments where hierarchical resource groups may be set up at client request (e.g., group 120B of FIG. 1, which includes group 120C), a pool creation request 210 may include composite policy generation guidelines 509, indicating for example how bandwidth distribution and/or pricing policies for the containing group relate to the corresponding policies of the contained groups. Guidelines 509 may, for example, indicate which (if any) aspects of a policy specified for a parent or containing group are to be inherited by the resources of the contained groups, whether (and if so, how) the parent group policies are to generated based on combining elements of the child group policies, and so on.

Figure 5B:
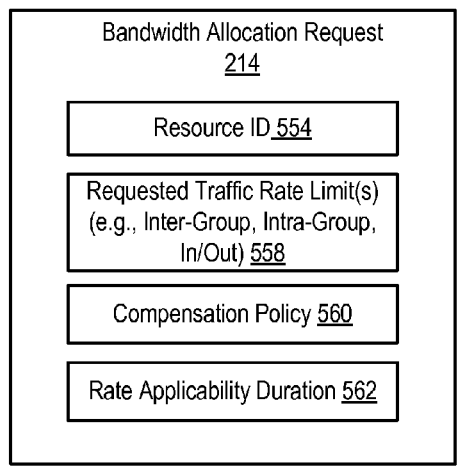
FIG. 5b illustrates example constituent elements of a resource-specific bandwidth allocation request, according to at least one embodiment.

FIG. 5b illustrates example constituent elements of a resource-specific bandwidth allocation request 214, according to at least one embodiment. Request 214 may include a resource identifier 554 of the resource 130 for which a portion of the containing resource group's total transfer rate limit is to be allocated. In addition, the requested traffic rate limit(s) 558 for different types of traffic may be specified for the resource 130 (similar to the different total rate limits specified for the group via elements 514, 516, 518, 520, 522, 524 and 526 of FIG. 5a). In some implementations, a bandwidth allocation request may be used when a rate limit is to be modified, as well as when it is to be set initially. In some embodiments, as mentioned earlier, when a traffic rate limit is increased for a given resource 130, the resource manager 180 may attempt to compensate for the increase by reducing the traffic rate limits for other resources of the group. In the embodiment depicted in FIG. 5b, the client may optionally specify the compensation policy 560 to be used, e.g., one or more identifiers of other resources whose traffic rate limits are to be modified to compensate for the requested traffic rate limit of the given resource identified in element 554 may be provided. In some implementations, if the bandwidth allocation request is being used to lower the traffic rate limit of the resource for a particular traffic type, the resource manager may increase the traffic rate limit or limits of other resources for that traffic type, e.g., to maintain the total traffic rate limit of the group at a constant level. In one implementation, the bandwidth allocation request 214 may also include rate applicability duration 562, indicating a time limit for which the requested traffic rate(s) 558 are to be enforced. For example, for some applications a client 148 may wish to temporarily increase the outbound inter-group traffic rate limit for a particular resource for a specified period such as an hour, and the client may use element 562 to specify that duration. In such an implementation, after the specified time period, the traffic rate limit for the resource may be changed back to its previous setting.

Figure 6:
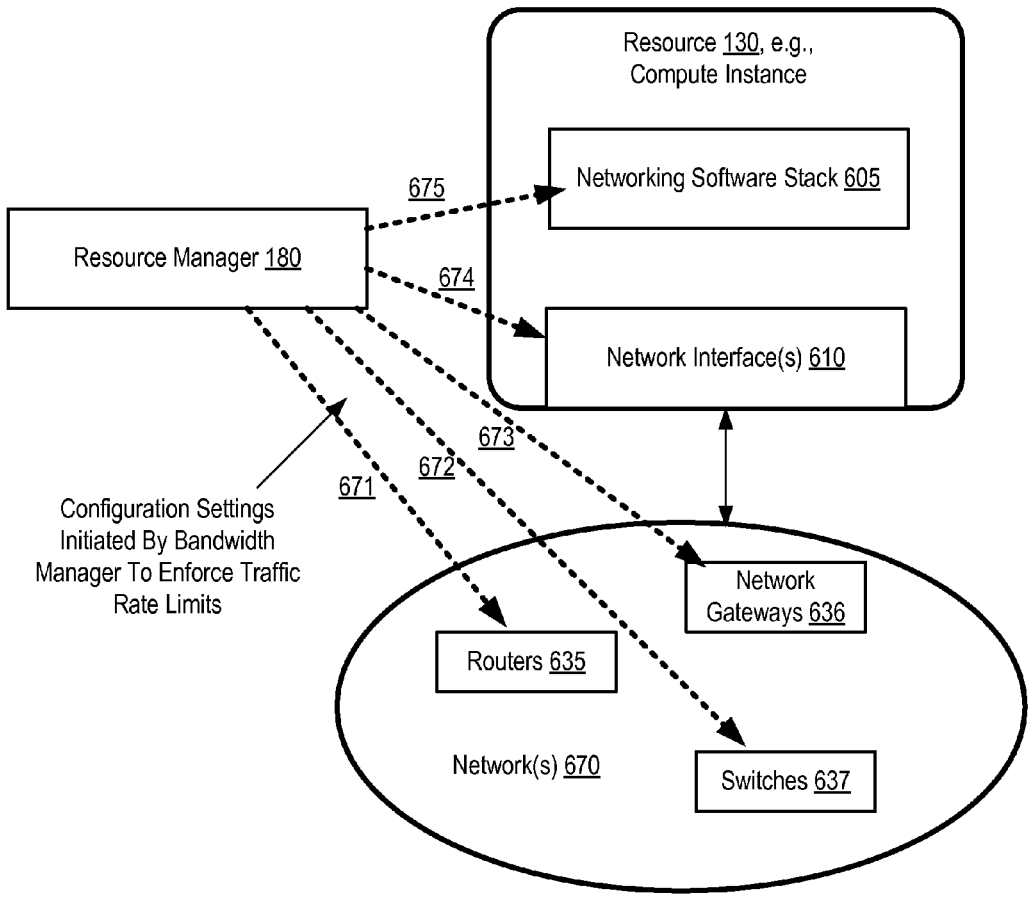
FIG. 6 illustrates example targets of configuration change operations that may be initiated by a resource manager to enforce bandwidth-related limits, according to at least one embodiment.

FIG. 6 illustrates example targets of configuration change operations that may be initiated by a resource manager 180 to enforce bandwidth-related limits, according to at least one embodiment. As shown by the arrows labeled 675 and 674, some of the configuration changes may be initiated on the resources 130—e.g., in the networking software stack 605, or at (physical or virtual) network interfaces 610 that are used to accept incoming traffic and transmit outgoing traffic. The networking software stack may comprise various layers, at any of which configuration settings may be modifiable in different implementations. For example, in implementations where variants of the Transmission Control Protocol/Internet Protocol (TCP/IP) suite of communication protocols is being used, configuration operations may be performed at the link layer, the Internet layer, the transport layer, the application layer, or at any combination of these layers. In implementations where the full seven-layer Open Systems Interconnect (OSI) model is used, where the equivalent of the TCP/IP application layer is further subdivided into a session layer, a presentation layer, and an OSI application layer, configuration changes may be made at the session and/or presentation layer as well as the four layers corresponding to the TCP/IP layers. Hypervisor networking configuration changes may be initiated for virtualized resources 130 in some embodiments. In some embodiments tunable configuration parameters may be used to control maximum and/or minimum traffic rates—e.g., a "maxBitsPerSecond" parameter may be used for maximum traffic rate and a "minBitsPerSecond" parameter may be used for minimum traffic rates. Traffic rates may be specified in other units as well in some implementations, e.g., maximum or minimum packets per second (where the maximum packet size may be a function of the specific protocol being used). In some embodiments, configuration changes affecting network latency or fault tolerance may be initiated by the resource manager 180, as well as, or instead of, changes affecting traffic rates.

In addition to the configuration changes 674 and 675 at the resources 130, the resource manager 180 may also initiate configuration changes at various network devices in networks 670 to which the resources 130 are linked—e.g., at routers 635, network gateways 636 established by the provider network operator (i.e., different from group gateway resources identified by the clients), and/or switches 637. In some implementations, the resource manager may change network configuration dynamically, e.g., based on traffic metrics obtained from metering agents; i.e., the configuration changes used to apply or enforce traffic rate limits for a particular resource 130 or resource group 120 may not all be performed at the time that an allocation request 214 or a pool creation request 210 is received. The resource manager may in some implementations specify traffic rate limits to agents on one or more network devices (such as switches) or servers, so that the agents drop network messages or packets if an attempt to exceed the traffic rate limit from a particular resource or resource group is detected. Depending on the networking protocol in use (e.g., whether and how flow control and/or congestion control techniques are implemented in the protocol), dropping even a few packets may result in an automatic lowering of the rate at which packets are transmitted from the sender in some implementations.

Methods and Web Interfaces for Bandwidth Pools

Figure 7:
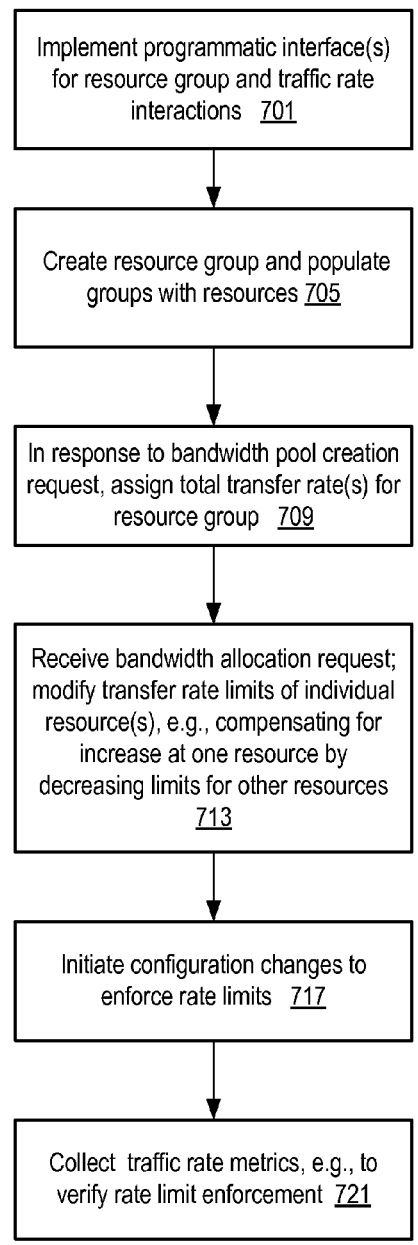
FIG. 7 is a flow diagram illustrating aspects of the functionality of a resource manager related to bandwidth pool creation and allocation of resource-specific network traffic rate limits, according to at least one embodiment.

FIG. 7 is a flow diagram illustrating aspects of the functionality of a resource manager 180 related to bandwidth pool creation and allocation of resource-specific network traffic rate limits, according to at least one embodiment. As shown in element 701, the resource manager 180 (e.g., via its interface manager subcomponent 185) may implement one or more programmatic interfaces for resource group and traffic rate interactions with clients 148. In some embodiments, it may be possible for a client 148 to choose among several available interfaces for the same request—e.g., in one implementation, a request to create a bandwidth pool for a resource group may be submitted either via a web page, or via an API call, or using a custom GUI. In some embodiments, the resource manager 180 may create a resource group in response to a request received via one of the interfaces, and populate a resource group with resources (such as compute instances or storage instances) in response to other client requests (element 705). For example, when requesting an instantiation or launch of a compute instance, a client 148 may specify the resource group 120 into which the compute instance is to be launched in some implementations. As noted earlier, in at least some embodiments, a bandwidth pool may be created implicitly when a resource group is created.

In one implementation, when a client 148 requests the creation of a resource group 120, a bandwidth pool may be created automatically or implicitly for the resource group 120, i.e., without the need for a separate pool creation request. In other embodiments, clients 148 may instead or in addition be allowed to submit explicit bandwidth pool creation requests 210 for their resource groups 120. In response to a bandwidth pool creation request, in some embodiments the resource manager 180 may validate the request to determine whether to accept it—e.g., the resource manager may check that the requesting client 148 is authorized to create bandwidth pools for the resource group specified, and that the total traffic rate limit requested is supportable within the constraints of the equipment being used for the resources of the group and the network links accessible from the group. For example, if the network interface cards (NIC) available for each compute instance resource 130 of a group 120 with three such resources are limited to 1 Gbps each, in some implementations the resource manager may decide not to accept a pool creation request that specifies a total traffic rate of 10 Gbps for the group. In some implementations, the resource manager 180 may respond to a pool creation request 210 that cannot be accepted with a rejection message that indicates why the request is being rejected, thus allowing the client to resubmit the request with modifications. If the resource manager 180 decides to accept a pool creation request 210, it may assign a total transfer rate to the specified resource group (element 709 of FIG. 7), save a record of the total transfer rate in resource management database 190, and send a pool creation acknowledgement 212 to the client. As noted earlier, in some implementations the total transfer rate for the group 120 may be determined at least in part based on transfer rates (either default or non-default) assigned to the individual resources 130 of the group. In such an implementation, when a resource 130 joins the group (e.g., in response to a client's instance launch request) or leaves the group (e.g. in response to an instance termination request from the client), the total traffic rate for the group may be adjusted accordingly by the resource manager 180. In some embodiments, multiple total transfer rates may be assigned to a group—e.g., one total rate for intra-group traffic, another for inter-group traffic, and so on, as illustrated in FIGS. 3, 4a, 4b, and 5a.

After a set of one or more total transfer rates has been assigned to a group, in some embodiments a client 148 may submit a resource-specific bandwidth allocation request 214. The desired bandwidth rate limit for an individual resource may be expressed as a percentage or fraction of the total bandwidth rate of the group in some implementations; in other implementations, a client may have the option of deciding whether to specify the resource's bandwidth rate limit as an absolute quantity (e.g., "4 Gbps") or as a percentage (e.g., "50% of the group's total limit"). In response, the resource manager 180 may modify the transfer rate limit(s) of the specified resource (element 713 of FIG. 7). A client 148 may submit a single bandwidth allocation request to specify desired bandwidth settings for each of a plurality of resources in some embodiments. In one such embodiment, the client 148 may indicate whether all the settings indicated in a single allocation request should be applied as part of a single atomic transaction (i.e., so that either all the changes requested to the various resources' bandwidth limits are put into effect, or none are), or whether the resource manager 180 may apply as many of the settings as feasible even if some of the settings changes cannot be successfully committed. In some embodiments, a setting of a transfer rate limit for one resource of a group 120 may result in compensating reduction (or increase) in the transfer rate limits of other resources of the group 120. In one implementation, a bandwidth pool creation request 210 may also include indications of resource-specific traffic rate limits; i.e., pool creation requests may be combined with per-resource transfer rate limit specification. The resource manager 180 may initiate configuration changes at various targets (such as those illustrated in FIG. 6) to enforce or implement the desired transfer rate limits (element 717). In some embodiments, at least some configuration changes may be initiated when the group total transfer rates are specified, in addition to configuration changes that are applied when an individual resource's limits are changed. The resource manager 180 (e.g., via metrics collector subcomponent 183) may monitor traffic at various network locations to verify that the traffic rate limits of the various resources 130 and resource groups 120 are not being violated (element 721). Additional configuration changes and/or actions such as discarding network packets may be performed as needed to enforce the traffic rate limits in some implementations.

Figure 8:
FIG. 8 illustrates a portion of an example web-based interface that may be implemented to allow clients to submit bandwidth pool creation requests, according to at least one embodiment.

FIG. 8 illustrates a portion of an example web-based interface that may be implemented to allow clients 148 to submit bandwidth pool creation requests 210, according to at least one embodiment. As shown, the interface comprises a web page 800 with a message area 803 and one or more sets 807 of form fields that a client may fill to specify various details of the desired bandwidth pool. In the depicted embodiment, a name of the resource group 120 for which the pool is to be created may be specified via field 809. The client may specify separate intra-group and extra-group traffic rate limits using fields 811 and 813 respectively. A compensation policy may be specified for the pool via field 815—e.g., indicating that when an increase to one resource's rate limit results in exceeding the group's total rate limit, the limits for all the other resources are to be lowered by equal amounts. Using fields 817, 819, 821, 823, and 825, the client 148 may specify the per-resource intra-group traffic rate limits and extra-group traffic rate limits for the individual resources of the group. The per-resource limits may be specified as percentages of the total rates of the group, or as absolute quantities, in different embodiments. For example, in the illustrated example, the client has decided to allocate 80% of the extra-group traffic rate limit of 5 Gbps to "Cluster Instance 001". In some embodiments, the customer requested rates may be specified as percentages while minimum and maximum limits are specified as absolute quanties (e.g., 50% of total allocation or otherwise a maximum 10 Gbps, whichever is smaller).

Bandwidth Rate Pricing Policies, Methods and Interfaces

Figure 9:
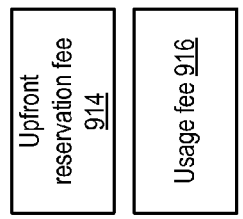
FIG. 9 illustrates examples of bandwidth pricing models that may be supported by a resource manager, according to at least one embodiment.
Figure 9:
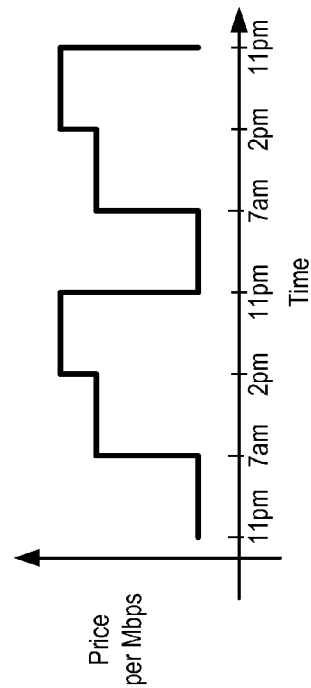
Figure 9:
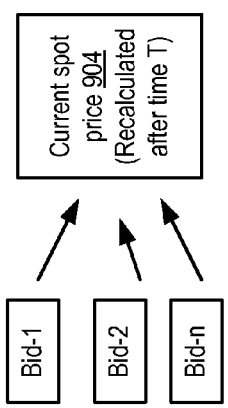
Figure 9:

In some embodiments, resource manager 180 may support a plurality of bandwidth pricing policies, which may differ from one another in several ways—e.g., whether the policies comprise different pricing components based on the source or destination of the traffic, the time period for which a price is to remain applicable, and so on. FIG. 9 illustrates examples of some bandwidth pricing models that may be supported by a resource manager 180, according to at least one embodiment. Four different pricing models, distinguished from each other on the price applicability duration, are shown.

In a dynamic spot-pricing model 902, clients 148 submits bids (such as Bid-1, Bid-2, and Bid-n) indicating the maximum price they are willing to pay for a desired traffic rate— e.g., one client 148A may submit a bid price of US$0.05 per Gbps for a desired traffic rate of 5 Gbps for their resource group 120A, while another client 148B may submit a bid price of US$0.06 per Gbps for a desired traffic rate of 4 Gbps for their resource group 120B. Depending on various factors, such as the current measured or anticipated traffic rates in various portions of the provider network 110, the specific paths or routes to which the requested bid applies, and the set of bids it receives, the resource manager 180 may determine a current spot price 904 in some embodiments, applicable at least to a particular subset of the provider network. If the bid from a particular client equals or exceeds the spot price, the bid may be accepted, and the transfer rate(s) requested by the client may be allowed at the current spot price. The resource manager 180 may re-compute the spot price at pre-defined intervals, or when new bids arrive or clients otherwise relinquish resources. If the spot price increase beyond the (previously accepted) bid specified by a particular client 148, implementations the client may have to submit a higher bid if the traffic rate limit of the previous bid is to be maintained. In some embodiments different spot prices may be determined for different source-destination combinations—e.g., one spot price may be applicable to inter-group traffic within an availability zone, and another may be applicable between availability zones.

In a long-term traffic rate reservation pricing model 912, a client 148 may reserve bandwidth for a resource group in advance, for a specified reservation term, by paying an upfront reservation fee 914 in the embodiment shown in FIG. 9. After the reservation is accepted, the client 148 may pay a usage fee 916, e.g., based on the actual traffic rates measured during the reservation term. For example, in one implementation a client 148 may make a reservation for 10 Gbps traffic from one resource group 120A to another resource group 120B for a year, with an upfront fee of US$100 and a usage fee of US$0.02 per Gbps. By paying the upfront reservation fee, the client 148 may reduce the uncertainty associated with dynamic spot-pricing, for example, and may also be able to obtain fairly low usage-based prices.

If a client 148 wishes to avoid the commitment (and upfront free 914) of a long-term reservation and still retain greater certainty over pricing than may be possible with spot-pricing, the client may opt for on-demand pricing model 922 in the depicted embodiment. In the on-demand model, the client 148 may submit a request for a traffic rate for a fixed price (made known to the client in advance) and for a short term (e.g., an hour). If the resource manager 180 can support the desired traffic rate (e.g., if sufficient spare bandwidth is available), the request may be accepted, and the client may be required to pay the on-demand price for the short term, whether the measured traffic rate is less than the requested rate or not. After the short term for which the on-demand price is applicable expires, the client may extend the term if the resource manager has sufficient capacity available in some implementations.

In some embodiments, the resource manager 180 may be able to offer time-window based pricing 932, in which the price for the same traffic rate between the same source and destination varies by time of day or by day of the week. The resource manager may be able to identify recurring patterns of low network utilization in various sections of the provider network 110, for example, and may be able to offer lower prices for those low-utilization periods. In the depicted embodiment, for example, three time windows are indicated based on the time of day—one price per Gbps may apply between 11 PM and 7 AM, a second price between 7 AM and 2 PM, and a third price between 2 PM and 11 PM. Different timing windows may be established for various combinations of data centers or availability zones and time zones in some embodiments—e.g., one set of timing window-based prices may apply to traffic between a data center DC1 (located in time zone TZ1) and DC2 (also located in time zone TZ1), and another to traffic between DC1 and data center DC3 in a different time zone TZ2.

In some embodiments, combinations of the approaches shown in FIG. 9 may be selectable by clients for different source/destination combinations among the resources 130 allocated to the clients or accessed by the clients. For example, for intra-group traffic, a client 148 may choose long-term reservation based pricing, while for occasional traffic between availability zones, the same client may opt for on-demand pricing. In some implementations, pricing policies may be selectable at the per-resource level, as well as at the resource group level.

Figure 10:
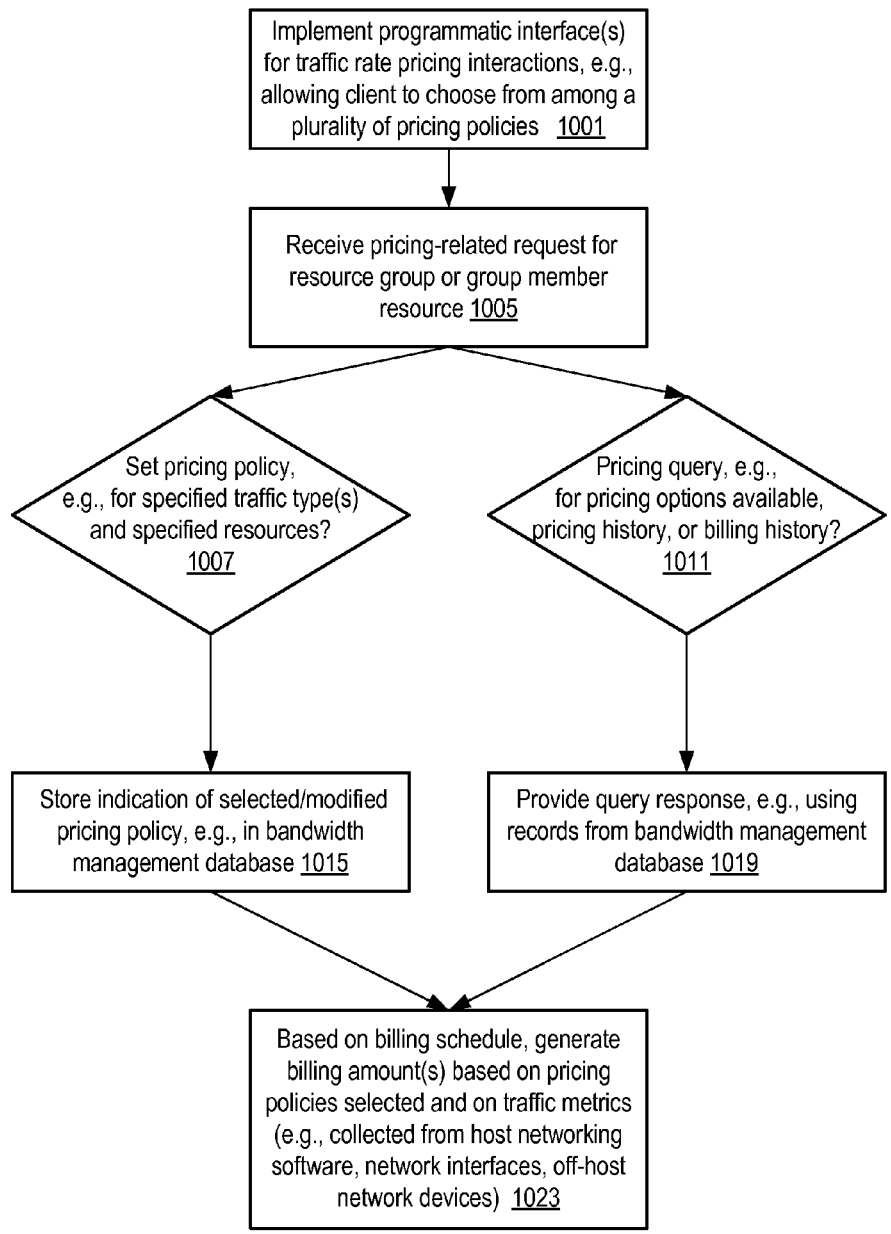
FIG. 10 is a flow diagram illustrating aspects of the functionality of a resource manager related to bandwidth pricing, according to at least one embodiment.

FIG. 10 is a flow diagram illustrating aspects of the functionality of a resource manager related to capability-based pricing (e.g., based on bandwidth, latency, or fault resiliency), according to at least one embodiment. Bandwidth is used as the primary example of a capability that is used for determining pricing in the following description; however, similar pricing-related techniques may be used with respect to other capabilities in at least some embodiments. As shown in element 1001, the resource manager 180 (e.g., using interface manager subcomponent 185) may implement one or more programmatic interfaces (such as API sets, web pages, command-line tools, or GUIs) for pricing-related interactions, such as allowing a client to select a pricing policy to be applied for bandwidth use by the client's resources 130 or resource groups 120. The resource manager 180 may then receive a pricing-related request for a resource group 120 or a member resource 130 of a resource group (element 1005 of FIG. 10). If the request is to select or modify a pricing policy for a specified resource 130 or resource group 120 (as detected in element 1007), the resource manager 180 may store an indication of the selected or changed pricing policy, e.g., in bandwidth management database 1015. In some embodiments, the client may select combinations of pricing models, with different pricing components for different types of traffic, to be used for a given resource group 120. For example, a particular pricing policy selectable by the client in one embodiment may include a first pricing component based at least in part on an intra-group network traffic rate between the resources of one resource group 120A and a second pricing component based at least in part on an extra-group network traffic rate between a designated gateway resource of the resource group 120A, and a network destination external to the first resource group. In embodiments where clients may combine existing resource groups to form higher-level groups (e.g., resource group 120B in FIG. 1, which comprises resource group 120C), a client may also provide pricing policy combination guidelines to indicate if (and how) the bandwidth pricing policies of the child groups are to be used to determine a composite bandwidth pricing policy of the parent group.

In at least some embodiments, the resource manager 180 may also support a number of read-only bandwidth pricing-related and billing-related operations, such as a query to determine the set of bandwidth pricing policies or options available to a client for a specified set of resources, a query to view bandwidth pricing history or bandwidth billing history. If such a query request is received (as detected in element 1011 of FIG. 10), the resource manager 180 may in some embodiments obtain the requested information, e.g., by looking up records in resource management database 190, and provide the information to the requester (element 1019).

Depending on the pricing policy or policies selected by the client 148, the resource manager may determine billing amounts to be charged to the client for bandwidth used for the client's resources 130 and resource groups 120 (element 1023). The resource manager 180 may use a variety of techniques to determine the rates at which traffic flows to and from the client's resources 130—e.g., in some embodiments the destinations and sizes of various data packets may be analyzed at the source resource 130, or at network devices along the paths of the data packets. In some embodiments, e.g., to ensure that the overhead of monitoring needed to keep track of traffic rates remains relatively low, traffic rates may be monitored using hardware devices such as network taps similar to those usable for network intrusion detection systems. Based for example on a billing schedule for the client (which may be specified in a service agreement established with the client), the resource manager 180 may provide billing statements to the client, including the bandwidth billing amounts derived from the pricing models selected by the client. In at least one embodiment, a client 148 may select one pricing policy for a traffic rate (between a specified source/destination resource pair or resource group pair) up to a threshold rate, and a different pricing policy to be applied if the threshold rate is exceeded. For example, the client 148 may select a long-term reservation based policy for up to 10 Gbps, and an on-demand pricing policy for traffic rates beyond 10 Gbps.

Figure 11:
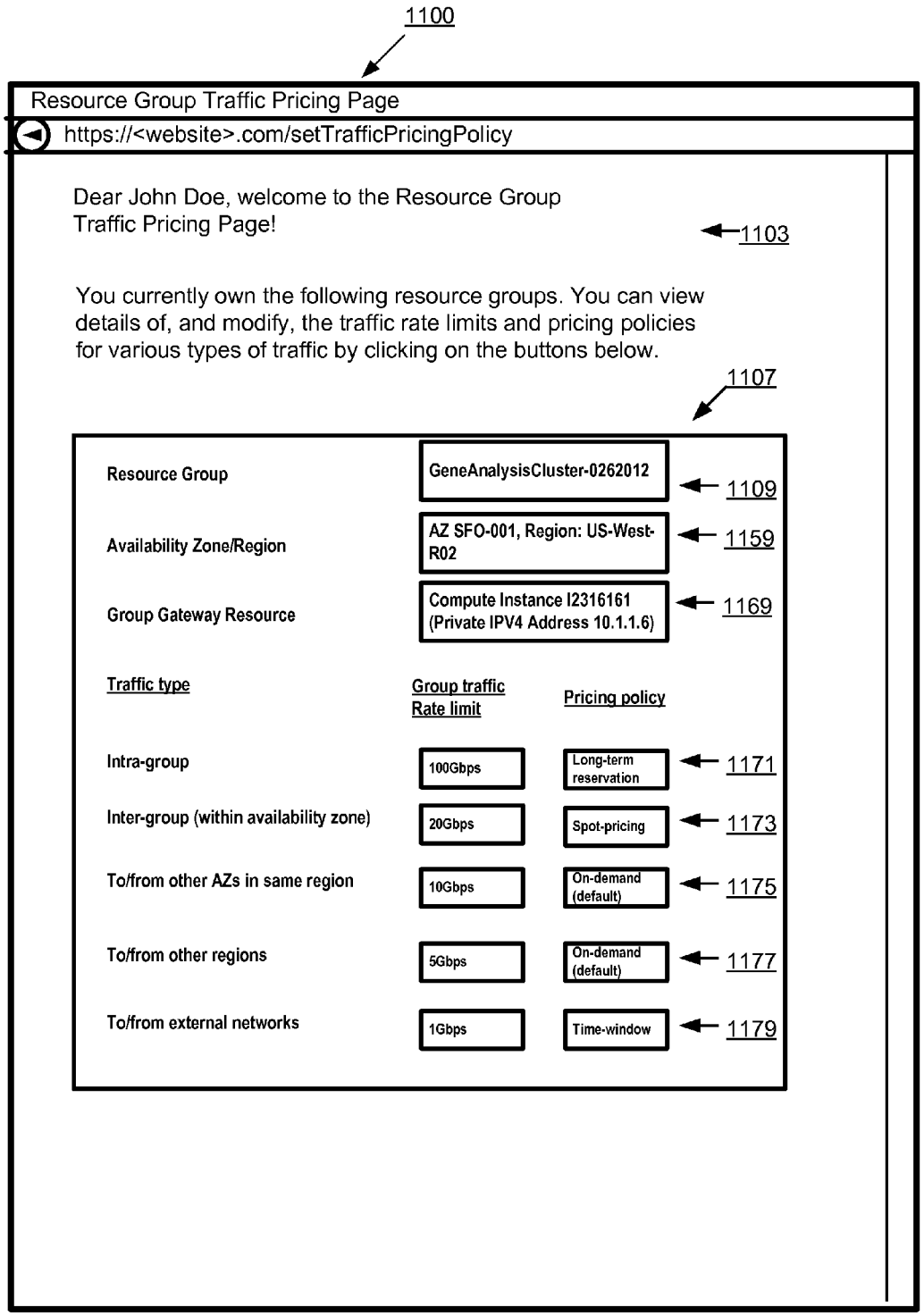
FIG. 11 illustrates a portion of an example web-based interface that may be implemented to allow clients to select bandwidth pricing policies for resources allocated to the client, according to at least one embodiment.

FIG. 11 illustrates a portion of an example web-based interface that may be implemented to allow clients 148 to select bandwidth pricing policies for resources 130 allocated to the client, according to at least one embodiment. As shown, the interface may comprise a web page 1100 that includes a message area 1103 and one or more sets of form fields 1107 in which the client 148 may specify pricing preferences. In the depicted example, the client has one resource group (identified in element 1109) in an availability zone and geographic region specified in element 1159. A group gateway resource is identified by its name and IP address in element 1169.

In the depicted example, the client 148 may specify group traffic rate limits, as well as corresponding pricing policies, for five different traffic categories. One pricing policy (currently set to "long-term reservation" pricing) may be selected for intra-group traffic using field 1171. A second policy (set to spot pricing) may be selected for inter-group traffic within the same availability zone, using filed 1173. A third policy, for traffic to/from other availability zones within the same geographical region, may be selected via field 1175. For traffic to/from other regions, field 1177 may be used to specify a pricing policy, and for traffic to/from external networks outside the provider network, such as client networks at the client's own data centers, field 1179 may be used. In some embodiments, a client 148 may be able to specify a combination of pricing policies for a single traffic category—e.g., a client may want to use a long-term reservation pricing policy for up to 5 Gbps of intra-group traffic, but switch to spot pricing or on-demand pricing if a short-term burst in intra-group traffic results in a higher rate than 5 Gbps. Additional links may be provided via web page 1100 to specify such pricing policy combinations in some implementations.

Support for Circuit Switching Emulation

Figure 12:
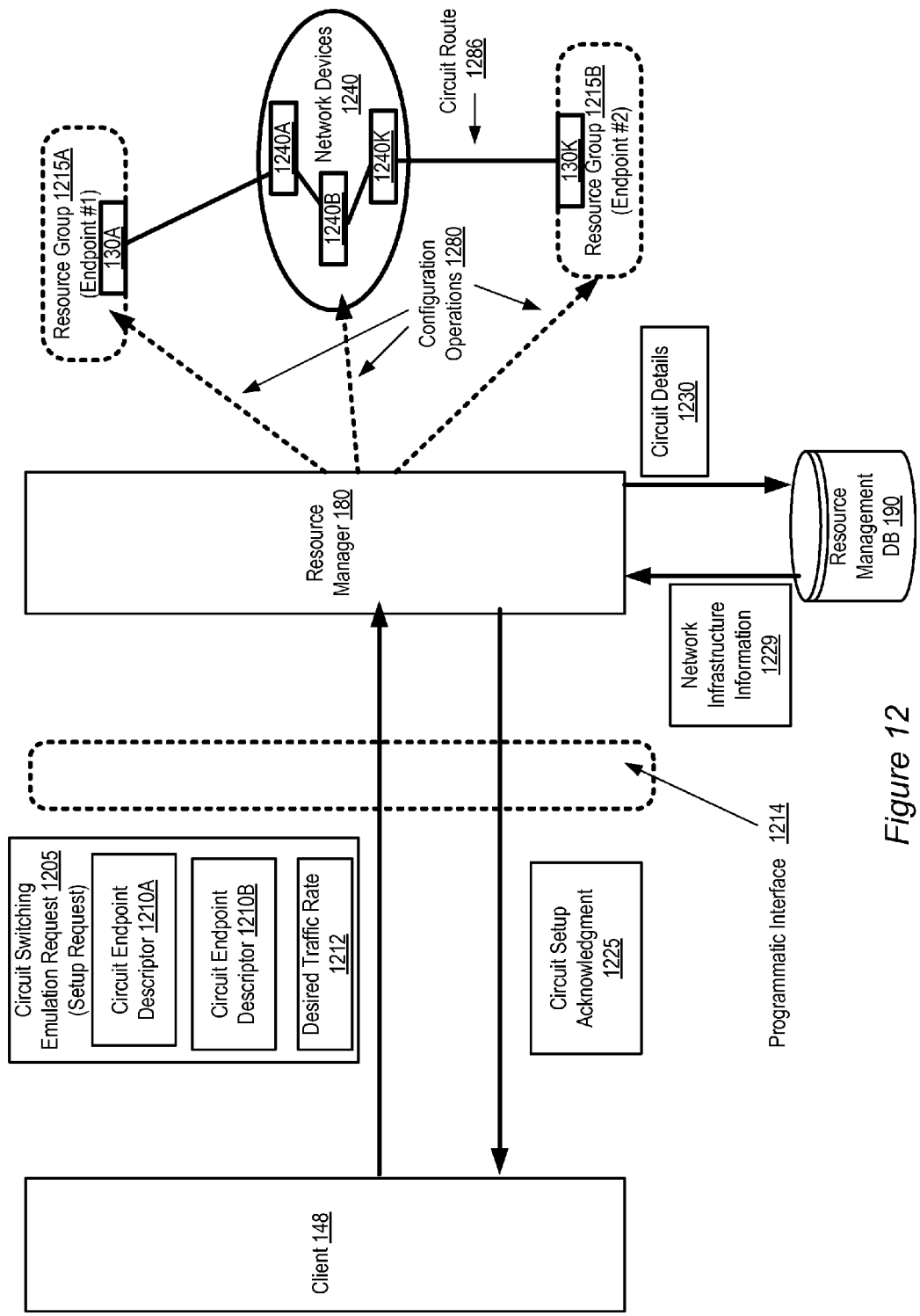
FIG. 12 is an illustration of example circuit switching emulation-related interactions between a client and a resource manager, according to at least one embodiment.

In at least some embodiments, the resource manager 180 may allow clients to specify endpoints (e.g., resource groups or specific resources) between which a circuit-switched network connection is to be emulated. That is, the resource manager 180 may attempt to "guarantee" support for (or provide a very high probability of support for) a desired network capability between the endpoints specified by the client 148, e.g., using bandwidth capacity dedicated for the client's use. FIG. 12 is an illustration of example circuit switching emulation-related interactions between a client 148 and a resource manager 180, according to at least one embodiment. As shown, a client 148 may submit a circuit switching emulation (CSE) request 1205 to the resource manager 180, specifying respective descriptors 1210A and 1210B of the endpoints between which the circuit is to be established, and a desired traffic rate 1212 to be supported between the endpoints. In some embodiments, CSE requests may specify other desired network capabilities (such as latency or fault resiliency) instead or, or in addition to, traffic rates. CSE requests may also be referred to as circuit setup requests herein. In the illustrated example, the endpoint descriptor 1210A may specify a resource group 1215A (which may, for example, have a group gateway resource 130A currently designated to handle traffic flowing out of the resource group and into the resource group), and the endpoint descriptor 1210B may similarly specify a second resource group 1215B (with its own currently designated group gateway resource 130K). In some implementations the two endpoints may be located in different geographical regions, different availability zones, or different data centers. An endpoint descriptor may specify a single resource (i.e., instead of a resource group) for which the desired connectivity is to be established with the other endpoint in some embodiments. In some cases the endpoints may have different functions with respect to a particular client application—e.g., one endpoint may include compute resources implementing the logic of the application, and the other endpoint may include storage resources at which at least a portion of the application data being manipulated by the compute resources is stored periodically or replicated periodically.

In response to the CSE request 1205, the resource manager 180 may look up network infrastructure information 1229 from a variety of sources, such as resource management database 190 or various network devices and/or metering agents 140 (shown in FIG. 1) of the provider network 110. Such network infrastructure information may allow the resource manager to determine, for example, whether there is sufficient networking capacity available to support the desired traffic rates 1212, and if there is, which specific intermediate network devices can be used to establish a route supporting the desired connectivity. If the resource manager 180 determines that the desired traffic rates can indeed be supported, the resource manager may identify one or more routes 1286 (e.g., a primary route and one or more backup routes) for the circuit to be emulated in the depicted embodiment. The resource manager may initiate or perform various configuration operations 1280 at the endpoints and/or network devices 1240 identified for the circuit, and save circuit details 1230 (such as the routes selected, the time of establishment of the circuit, the supported traffic rate, and so on) in the resource management database 190. In some embodiments the configuration changes may reserve bandwidth capacity for exclusive use by the client, i.e., no other traffic may be allowed along certain links, or traffic generated on behalf of other clients may be limited to a subset of the bandwidth capacity of certain links. The client may be notified that the circuit switching emulation request was accepted, e.g., via a circuit setup acknowledgement 1225 in some embodiments. The resource manager 180 may then monitor the traffic along the selected route or routes, verifying that traffic up to the requested rate is flowing, and taking any additional actions (e.g., dropping packets, changing routes, making additional configuration changes) that may be required to ensure that the client's requested traffic rate continues to be supported and that the traffic rate between the endpoints does not exceed the requested rate. If the resource manager 180 is unable to accept the CSE request, e.g., if sufficient bandwidth capacity cannot be found, the resource manager 180 may notify the client regarding the rejection.

Figure 13:
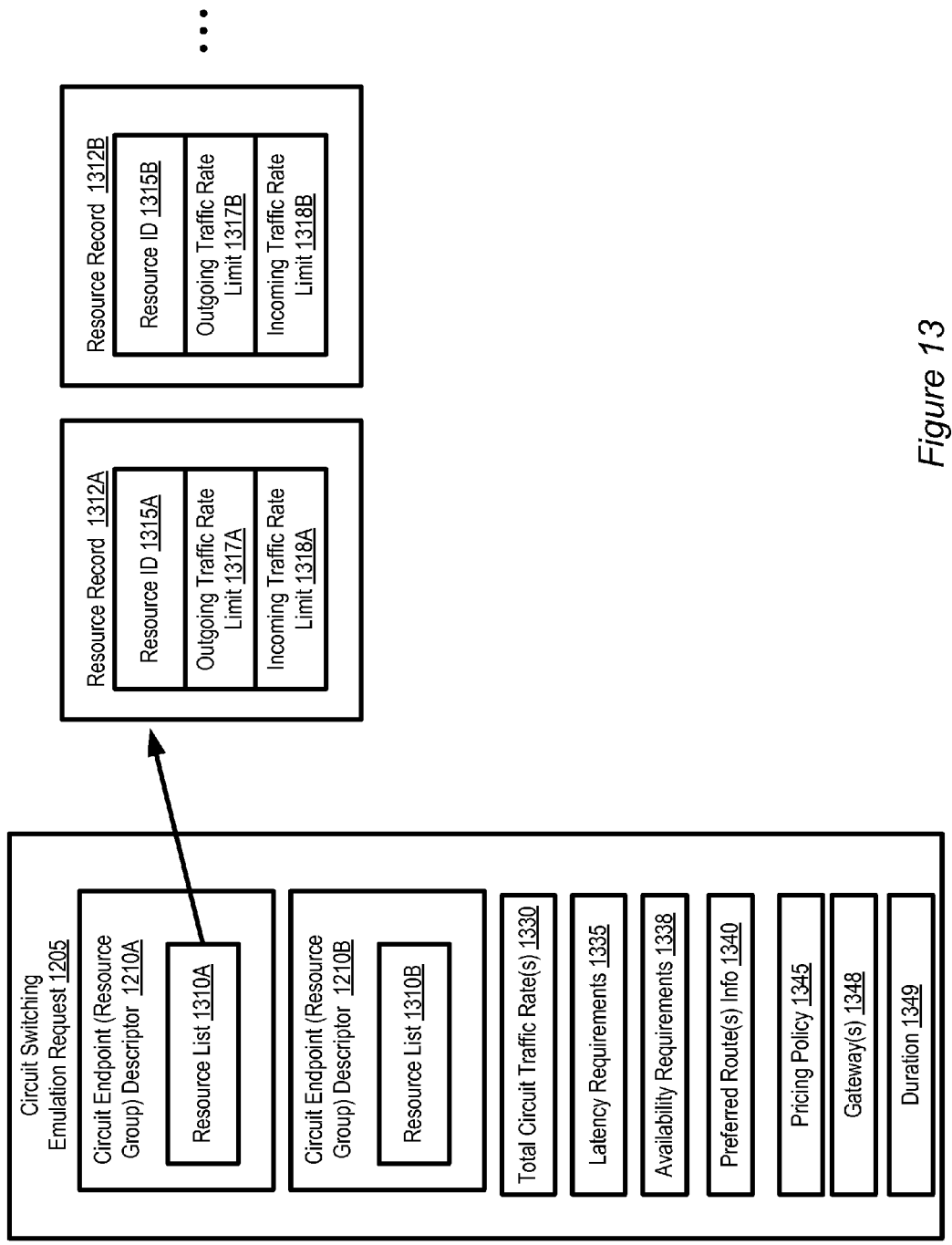
FIG. 13 illustrates example constituent elements of a circuit switching emulation request, according to at least one embodiment.

FIG. 13 illustrates example constituent elements of a circuit switching emulation request 1205, according to at least one embodiment. In the depicted embodiment, the circuit endpoint descriptors 1210 each comprise a resource list 1310 for the resources of the resource groups that are to be connected—e.g., resource list 1310A for endpoint descriptor 1210A and resource list 1310B for endpoint descriptor 1210B. Each resource list 1310 may comprise a set of resource records 1312, such as resource records 1312A and 1312B of resource list 1310A. A resource record such as 1312A may include a resource identifier 1315A, a desired outgoing traffic rate limit 1317A for the resource, and a desired incoming traffic rate limit 1318A for the resource. In some embodiments total traffic rate(s) for each direction of traffic (endpoint 1210A to endpoint 1201B, and endpoint 1210B to endpoint 1210A) over the emulated circuit may be specified, e.g., via element 1330.

In at least one embodiment, latency requirements for data transfers of one or more specified sizes may also be specified via another constituent element 1335 of the CSE request. In one implementation, the requesting client 148 may specify a minimum availability level for the desired connectivity—e.g., the client may indicate via element 1338 that the desired traffic rate(s) need to be supported at least 99.99% of the time. In some embodiments the client 148 may indicate one or more characteristics of preferred routes between the endpoints via preferred route(s) information element 1340—e.g., one or more routing table entries, the maximum number of network hops desired, or identifiers such as IP addresses of specific network devices to be used for the route selected for the circuit may be specified. In some embodiments routing information may be provided using virtual network addressing, and the resource manager may translate the virtual addressing to physical addresses as needed. For example, some resource managers may support "virtual private cloud (VPC)" configurations in which a client is provided a logically isolated network within which the client may assign network addresses of its choice to various resources. In some such embodiments, the routing preferences 1340 may be specified using VPC addresses by the client, and the resource manager 180 may use its knowledge of the VPC configuration to interpret the routing preferences.

In some embodiments, the client 148 may be able to choose among several alternative pricing policies for the circuit via a pricing policy field 1345. For example, the client may wish to place a bid for the circuit, and the resource manager 180 may accept or decline the bid based on factors such as the current or anticipated demand for bandwidth (from other clients) along the possible links between the endpoints. In one implementation the client 148 may specify one or more group gateway resources using element 1348. Group gateway resources may be identified implicitly by excluding non-gateway resources from the resource lists 1310 in some embodiments—i.e., not all the resources 130 of the endpoint groups may be listed in the resource lists 1310 in such embodiments. In at least one embodiment, a duration for which the circuit is to be emulated may be specified in the CSE request, e.g., via element 1349. It is noted that while FIG. 13 illustrates a scenario in which the endpoints of the desired circuit are resource groups, in other scenarios circuit switching emulation may be requested for individual resources—i.e., at least in some embodiments, the endpoints may be specified as single resources 130 rather than resource groups 120.

Figure 14:
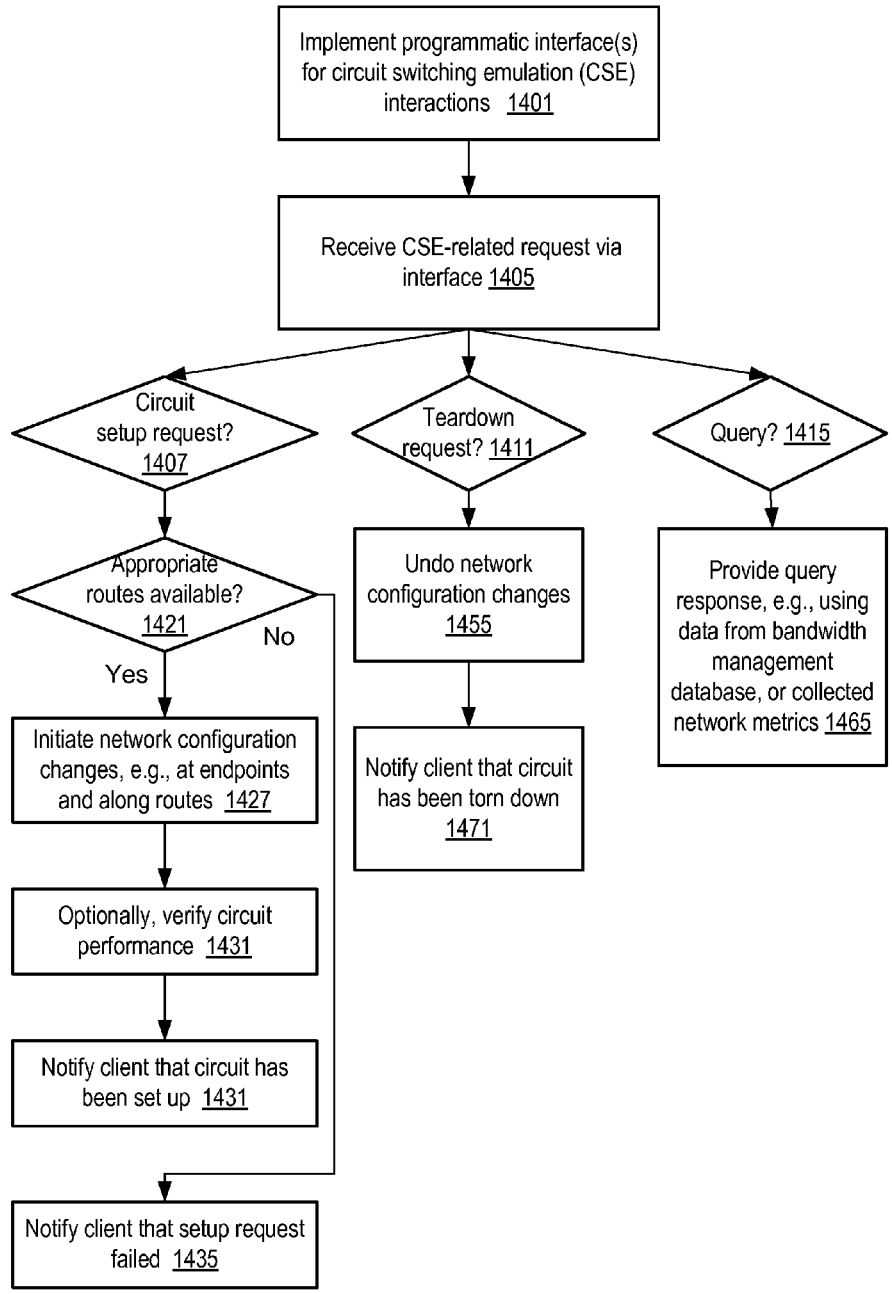
FIG. 14 is a flow diagram illustrating aspects of the functionality of a resource manager related to circuit switching emulation, according to at least one embodiment.

FIG. 14 is a flow diagram illustrating aspects of the functionality of a resource manager related to circuit switching emulation, according to at least one embodiment. As shown in element 1401, the resource manager (e.g., using interface manager subcomponent 185) may implement one or more programmatic interfaces (such as APIs, web pages and the like) to support various types of CSE interactions with clients 148, such as setup requests, teardown requests, or queries. When the resource manager 180 receives a CSE-related request via one of the programmatic interfaces (element 1405), the resource manager may take the appropriate set of actions based on the type of the request. If the request is a setup request, specifying circuit endpoints and a desired traffic rate to be supported between the endpoints (as detected in element 1407), the resource manager 180 may determine whether the networking infrastructure available to it, and the current rates of utilization of various network links of that infrastructure, can support the desired traffic rates between the endpoints. If the resource manager can find one or more suitable routes between the endpoints (as determined in element 1421), the resource manager 180 may proceed to initiate one or more network configuration changes, e.g., at the endpoints or along the routes selected, to enable the desired traffic rate or rates (element 1427). In some situations, the resource manager 180 may simply be able to use existing routes and may not have to initiate any additional configuration changes for emulating the desired circuit-switching behavior.

In at least one embodiment, the resource manager 180 may optionally verify the performance of the emulated circuit (element 1431), e.g., by transmitting a data set from each endpoint to the other and verifying that the desired traffic rate(s) and/or latencies can in fact be supported. The resource manager 180 may notify the client 148 that the requested circuit has been set up, i.e., that circuit-switching is now being emulated as requested. If the resource manager is unable to find appropriate routes to meet the client demands (as also detected in element 1421), the resource manager 180 may notify the client that the setup request failed (element 1435). In at least some embodiments, the resource manager 180 may reject a circuit setup request 1205 because of pricing-related reasons (e.g., instead of rejecting the request due to bandwidth or routing constraints). For example, the resource manager 180 may be able to find routes capable of supporting the desired traffic, but the pricing manager subcomponent 184 of the resource manager may determine that the price the client 148 is willing to pay (indicated in the setup request, e.g., via a pricing policy element 1345) is not high enough to make it worthwhile for the request to be accepted. In some such embodiments, the resource manager 180 may notify the client that the price indicated was too low, so that for example the client may submit another request with a different bid amount if desired.

The client 148 for whom a circuit was set up may submit a circuit teardown request to the resource manager 180 in the embodiment illustrated in FIG. 14, indicating that the circuit being emulated is no longer needed (or that the client is no longer willing to pay the agreed-upon price for the emulation). If such a teardown request is received (as detected in element 1411), the resource manager may undo some or all of the configuration changes that were performed to support the desired traffic rates between the endpoints (element 1455), thus potentially freeing up some bandwidth capacity for other purposes. The resource manager 180 may then notify the client 148 that the circuit has been torn down (element 1471).

If the resource manager receives a query (as detected in element 1415), e.g., a request for traffic metrics between the endpoints, the resource manager 180 may look up the requested information if the requester is authorized to view it, and provide the requested information to the requester (element 1465). The resource manager 180 may retrieve data saved earlier in the resource management database 190 to provide the query response, for example, or it may collect metrics from various metering agents in some embodiments.

Figure 15:
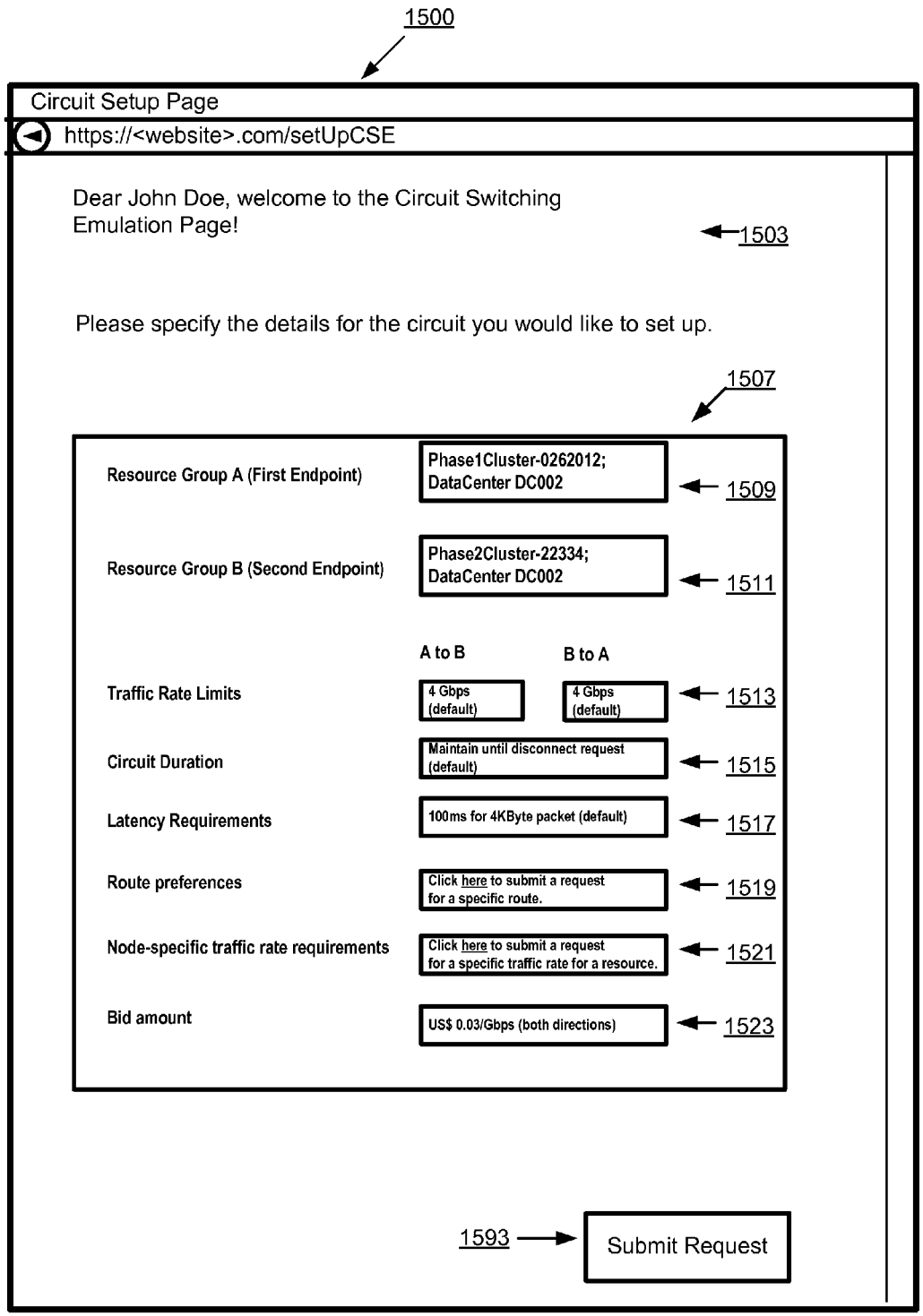
FIG. 15 illustrates a portion of an example web-based interface that may be implemented to allow clients to submit circuit switching emulation requests, according to at least one embodiment.

FIG. 15 illustrates a portion of an example web-based interface that may be implemented to allow clients 148 to submit circuit switching emulation requests, according to at least one embodiment. As shown, the interface may include a web page 1500, comprising a message area 1503 and a set of form fields 1507 allowing the client to specify various details regarding the desired connectivity. The two endpoints may be specified via respective fields 1509 and 1511. As noted earlier, in some embodiments single resources 130, rather than resource groups 120, may be designated as endpoints for a setup request 1205. In the depicted embodiment, the client 148 may specify (using fields 1513) one rate limit for traffic from the first endpoint to the second endpoint, and a different rate limit for traffic in the opposite direction, from the second endpoint to the first. Field 1515 may be used to specify a desired duration of the circuit, e.g., that the circuit should be maintained until a teardown or disconnect request is received. Filed 1517 may be used to specify latency requirements for the traffic between the endpoints. The requesting client 148 may submit information on route preferences (e.g., routing table entries, number of hops, or identification of intermediate network devices between the endpoints) via field 1519, and resource-specific traffic rate requirements via field 1521. In the depicted embodiment, the client 148 may submit a bid amount via field 1523, e.g., indicating the amount the client is willing to pay per Gbps of traffic. Button 1592 may be used to submit the request to the resource manager 180.

Capability-Optimized Resource Placement

In at least one embodiment, resource manager 180 may be operable to determine (e.g., with the help of placement optimizer subcomponent 182), for a potentially large set of requirements specified in a single client request, a placement plan that meets the client's networking needs (e.g., for bandwidth, latency or fault resilience) and/or other resource needs (e.g., legal compliance requirements, pricing constraints and the like). For example, a client 148 may wish to implement a complex multi-tier application architecture, potentially with dozens or hundreds of compute and storage instances of various types, and may be able to specify the characteristics of the traffic expected between the various types of instances, as well as the desired performance, availability and other characteristics of each type of instance. In a traditional approach, the client 148 could acquire the instances one at a time, or a few at a time. However, because the resource manager 180 would not be aware of the big picture with respect to connectivity needs for the application as a whole, this approach may potentially lead to a less-than-optimal placement of the instances on the hardware platforms available in the provider network 110—for example, the client's instances could be physically interspersed with other clients' instances (e.g., a single server rack may host instances for several clients), resulting in longer network paths with more network hops between any one client's instances than may be necessary. Instead, the client 148 may in some embodiments submit a specification of the requirements for all of the application's instances at once, and request that the resource manager 180 identify, as a unit, a mapping or placement of all the requirements to corresponding resource instances hosted on the platforms. At least in some cases, the resource manager 180 may be able to make more intelligent placement decisions (i.e., exactly which platforms and which network links or devices should be used for the various resources) when it is provided the complete set of requirements than if individual requests were submitted.

Figure 16:
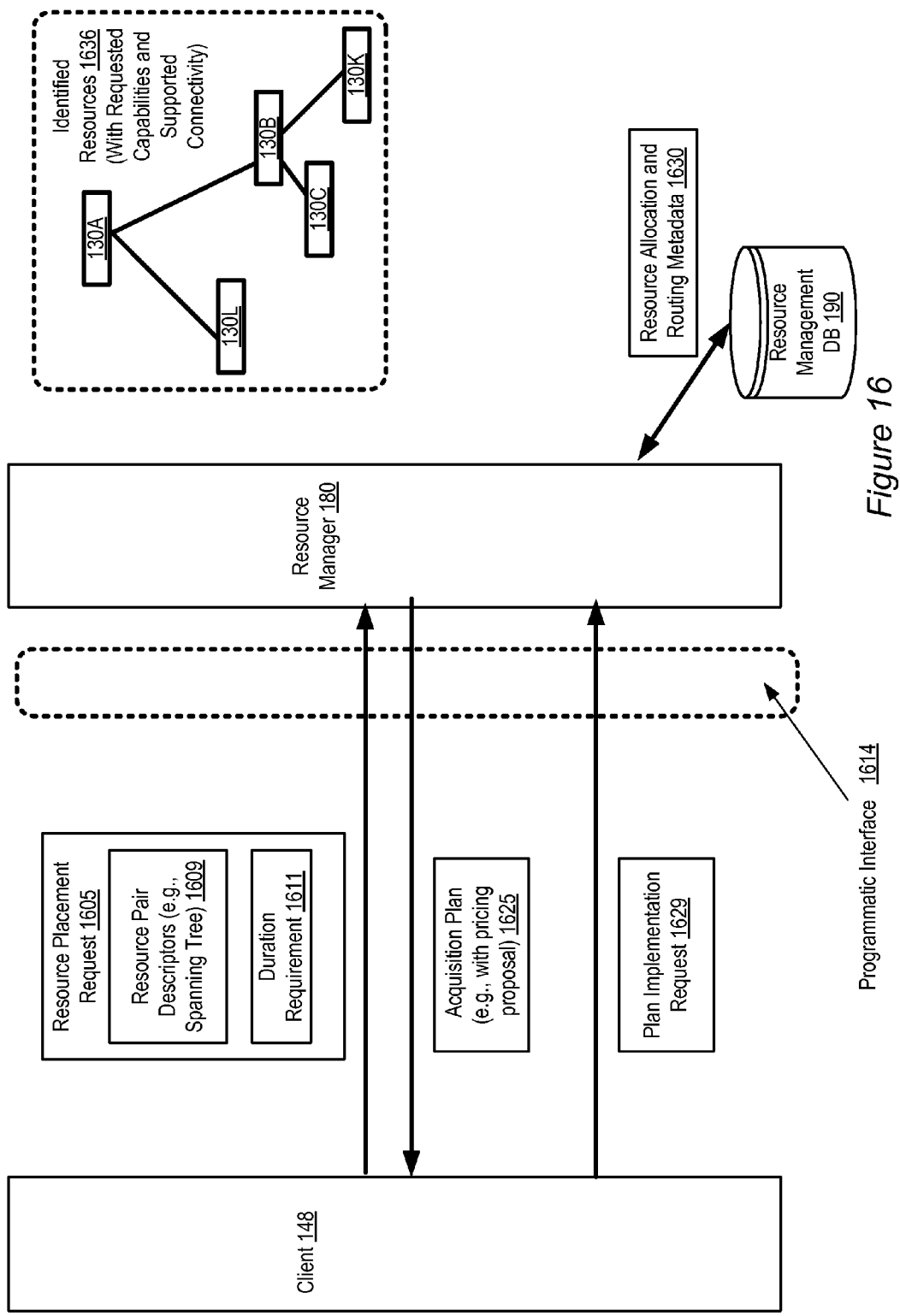
FIG. 16 is an illustration of example resource placement-related interactions between a client and a resource manager, according to at least one embodiment.

FIG. 16 is an illustration of example resource placement-related interactions between a client 148 and a resource manager 180, according to at least one embodiment. The client 148 may submit a resource placement request 1605 to the resource manager 180, including a plurality of resource pair specifications, where each resource pair specification indicates (a) a first desired capability of a first resource to be identified by the resource manager (b) a second desired capability of a second resource to be identified by the resource manager and (c) a desired network traffic rate to be supported between the first and second resources of the resource pair. The desired capability for a resource may be expressed as combinations of various resource attributes in some embodiments, such as for example, processing performance, memory size, storage capacity, software stack requirements, or availability requirements. Separate traffic rates may be specified for each direction of traffic flow between the resources of a given resource pair in some embodiments. In some implementations, the client 148 may also specify a duration requirement 1611, indication how long the resource pairs are to be used.

In response to receiving the placement request 1605, the resource manager may look up resource allocation and routing metadata 1630 from various sources, such as resource management database 190, to find the required infrastructure components (e.g., hardware platforms capable of supporting the desired resources and desired connectivity) for the client's request. If, for each resource pair specified by the client 148, the resource manager 180 is able to map resources to platforms and network paths with the desired characteristics, the resource manager may send an acquisition plan 1625 to the client. The acquisition plan may for example enumerate the different types of resources the resource manager has identified (e.g., the instance sizes of the various compute or storage instances, the types of interconnects between various resources, the types of networking devices that may be used, and so on) and an indication of how long it may take to acquire the resources. In some embodiments, the acquisition plan may include or be accompanied by a pricing proposal to the client, indicating the estimated price of the set of identified resources and network paths. The client 148 may thus be allowed to review the pricing proposal and decide whether to acquire the identified resources. If the client 148 agrees to the acquisition plan, and for example sends a plan implementation request 1629 to the resource manager 180, the resource manager may allocate the resources to the client, and initiate the networking configuration operations (e.g., operations similar to those discussed with respect to FIG. 6 above) needed to support the desired traffic rates between the resources. In some embodiments the resource manager may be configured to simply acquire the resources identified in response to the placement request, without transmitting an acquisition plan to the client and/or without receiving the client's approval.

Figure 17:
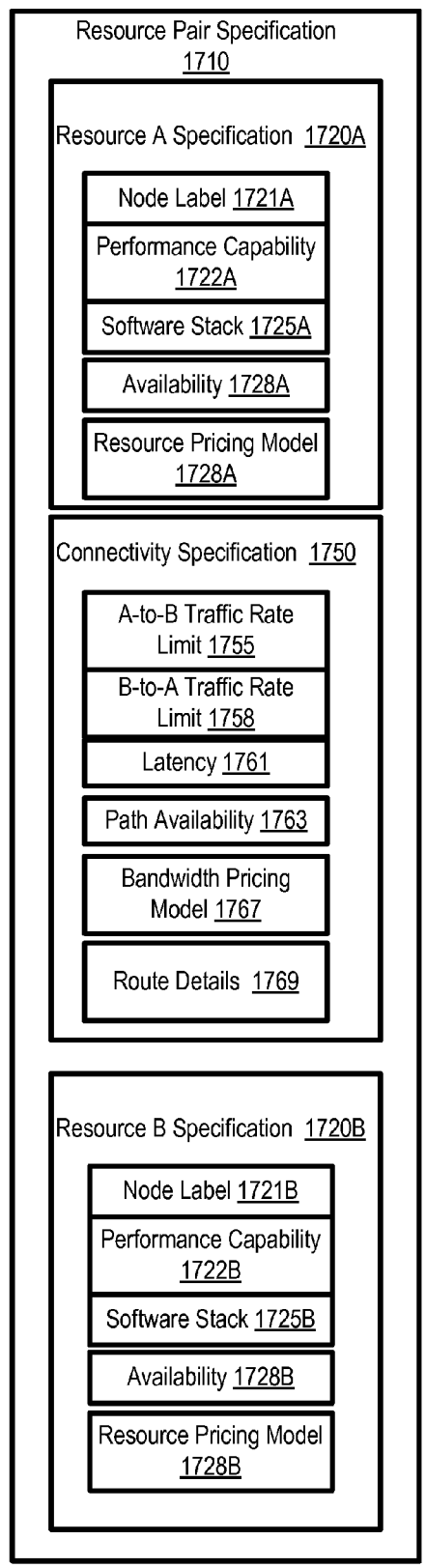
FIG. 17 illustrates example constituent elements of a resource pair specification that may be included in a resource placement request, according to at least one embodiment.

The format in which the resource pair specifications are provided to the resource manager may vary in different embodiments. In some implementations, the client 148 may be provided an interface to specify the resource pairs and traffic rates graphically or in a standard format using JSON (JavaScript Object Notation language) or XML (Extensible Markup Language), e.g., as a spanning tree of the desired client layout. FIG. 17 illustrates example constituent elements of a resource pair specification 1710 that may be included in a resource placement request 1605, according to at least one embodiment. The two resources of the pair are referred to as resources "A" and "B" in the illustrated example. The resource pair specification may include respective specifications 1720A and 1720B for the resources A and B, and connectivity specification 1750 for the network path or paths between the resources of the pair. In the depicted embodiment, resource specification 1720A may include a node label 1721A, a performance capability 1722A, a software stack requirement 1725A, an availability requirement 1728, and a resource pricing model 1728 selected by the client 148 for resource A. Resource specification 1720B may include similar elements for resource B. Node labels 1721, which may for example be strings specified by the client, may be used to refer to the corresponding resources from other resource pair specifications 1710. For example, a client may wish to specify traffic rate requirements between resources R1, R2, R3 and R4 using three resource pairs: (R1, R2), (R2, R3) and (R3, R4). In such a scenario, the client 148 may simply use the node label for R2 in the second resource pair, and the node label for R3 in the third resource pair, instead of having to specify the desired characteristics of the same resource more than once.

A resource's performance capability 1722 may be specified in some embodiments by referring to standard resource "sizes" implemented in the provider network. In one implementation, for example, the resource manager 180 may support a set of compute instance sizes such as "large", "medium" or "small" instances, and the client may indicate the performance capability 1722 of a compute instance resource by referring to one of the supported sizes. In other implementations, performance capabilities 1722 for compute resources may be expressed in other units, such as clock speeds of the CPUs or cores used, floating point operations per second (Flops), integer operations per second, industry-standard performance benchmark units such as SPECInt or TPC-C transactions per minute, and so on. Similarly, a variety of different performance units may be used to specify performance capabilities desired for other types of resources, such as, for storage resources, random writes per second, random reads per second, sequential writes per second, sequential reads per second, and so on. The software stack 1725 specified for a resource may, for example, include hypervisor vendors and versions, operating system vendors and versions, and installed application combinations. Availability 1728 may be specified in units such as maximum outage minutes per year, or a percentage such as 99.999% available. In some embodiments, clients 148 may be able to choose from among several pricing models 1728 for compute and storage resources, similar to the dynamic spot-pricing, long-term reservation based pricing, on-demand pricing and time-window based pricing discussed for bandwidth with reference to FIG. 9.

In the depicted embodiment, connectivity specification 1750 may include a traffic rate limit 1755 for traffic from resource A to resource B, and a different traffic rate limit 1758 for traffic from resource B to resource A. Clients may specify latency requirements 1761 for network traffic (e.g., the maximum time that an N-kilobyte packet should take to reach B from A or to reach A from B) in some embodiments. Desired network availability requirements 1763 may be expressed in some embodiments in units such as maximum disconnect minutes per year, or as the percentage of time the resources A and B are expected to remain connected. In some embodiments, clients 148 may be able to select from among various bandwidth pricing models (e.g., similar to those discussed with reference to FIG. 9) to specify the pricing model 1767 to be used for the resource pair. In at least one embodiment, a client 148 may provide details 1769 regarding the network route to be used to link resource A and resource B. Routing details may include, for example, the maximum network hops desired between the resources, or the types or numbers of network devices (e.g., switches, routers and the like) to be used for the route.

Figure 18:
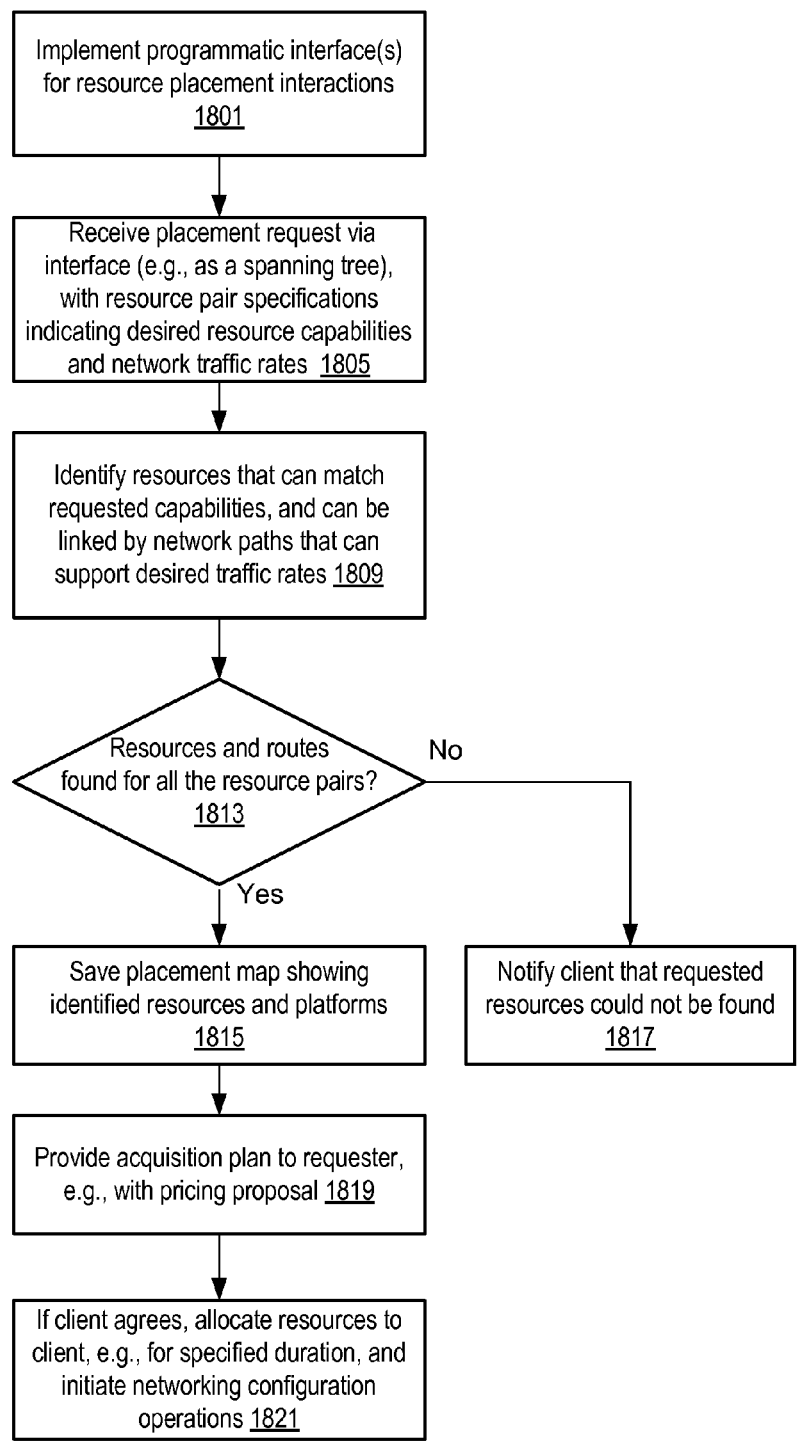
FIG. 18 is a flow diagram illustrating aspects of the functionality of a resource manager related to resource placement, according to at least one embodiment.

FIG. 18 is a flow diagram illustrating aspects of the functionality of a resource manager 180 related to resource placement, according to at least one embodiment. As shown in element 1801, one or more programmatic interfaces may be implemented (e.g., with the help of interface manager subcomponent 185) for resource placement interactions. The resource manager 180 may receive a resource placement request, specifying desired network traffic rates to be supported between specified pairs of resources (element 1805), as well as the desired capabilities (such as performance ratings, installed software stacks and the like) of the resources themselves. In some embodiments the desired connectivity between resources may be specified as a tree or graph comprising nodes representing resources and edges representing network paths with specified traffic rates between resources.

In response to the placement request, the resource manager 180 may attempt to identify resources that can match the desired capabilities and requirements, and can be linked by network paths with the desired networking capabilities (which may include bandwidth, latency or resilience) (element 1809). In some implementations, for example, the resource manager 180 may examine the metadata available to it regarding various types of computing and storage platforms available on which the resources could be instantiated in the provider network's data centers, and the networking devices and links that could be used. A placement optimizer subcomponent 182 of the resource manager may in one embodiment use combinations of one or more graph algorithms or heuristics to determine new mappings between compute or storage resources and underlying platforms, or to connect already instantiated compute instances in accordance with the desired traffic rates.

If the resource manager 180 is able to identify resources for all the requirements indicated in the placement request (as determined in element 1813), in some embodiments the resource manager 180 may generate a placement map of the identified resources (e.g., containing details such as which hardware platform is to be used for which resource) and save the placement map in database 190, as indicated in element 1815. The placement map may not be revealed to the client 148, at least in some embodiments, as the details of hardware platforms and data center layouts may be considered confidential information. In other embodiments, at least some version of the placement map (e.g., obfuscating actual location and platform details but still providing a logical overview of the resources in terms of network linkage) may be provided to the client 148, either as part of a response to the placement request or in response to a later query.

The resource manager 180 may provide an affirmative placement response, e.g., an acquisition plan, to the client that submitted the placement request (element 1819). The acquisition plan may in some embodiments include indications of the time it may take to configure the resources as desired by the client, and may list the different types of resources the resource manager has identified (e.g., the instance sizes of the various compute or storage instances, the types of interconnects between various resources, the types of networking devices that may be used, and so on). In some embodiments, the resource manager 180 (e.g., using its pricing manager subcomponent 184) may include a pricing proposal in the acquisition plan response, indicating the cost of allocating the identified resources interconnected in accordance with the desired capabilities specified in the placement request. If the client finds the pricing proposal acceptable (which may be indicated in a plan implementation request 1629 sent by the client), the resource manager 180 may allocate the identified resource in accordance with the placement map (element 1821). In at least some implementations, the resource manager may reserve the identified resources internally while it waits for the client to decide whether the resources should be acquired; such internal short-term reservations may be necessary to ensure that the identified resources are not allocated for some other purpose before a decision is made by the client that submitted the placement request. In one such implementation, the placement response to the client may include an indication of a deadline or the maximum time that the client can wait before indicating that the resources are indeed to be acquired; if no such indication is received before the deadline expires, the identified resources that were temporarily reserved may be freed by the resource manager 180. In other embodiments, these clients may be limited to a maximum number of such requests per unit time or otherwise charged a nominal fee per request. If and when the resources are allocated to the client 148, the resource manager 180 may initiate the networking configuration changes needed (e.g., at similar targets as indicated in FIG. 6, such as the resource network software stacks, physical or virtual network interfaces at the resources, or network devices along the identified network paths such as routers, switches or gateways). If the placement request 1605 specified a duration for which the identified resources are to be retained by the client, the resources may be allocated for the specified duration in some embodiments.

Figure 19:
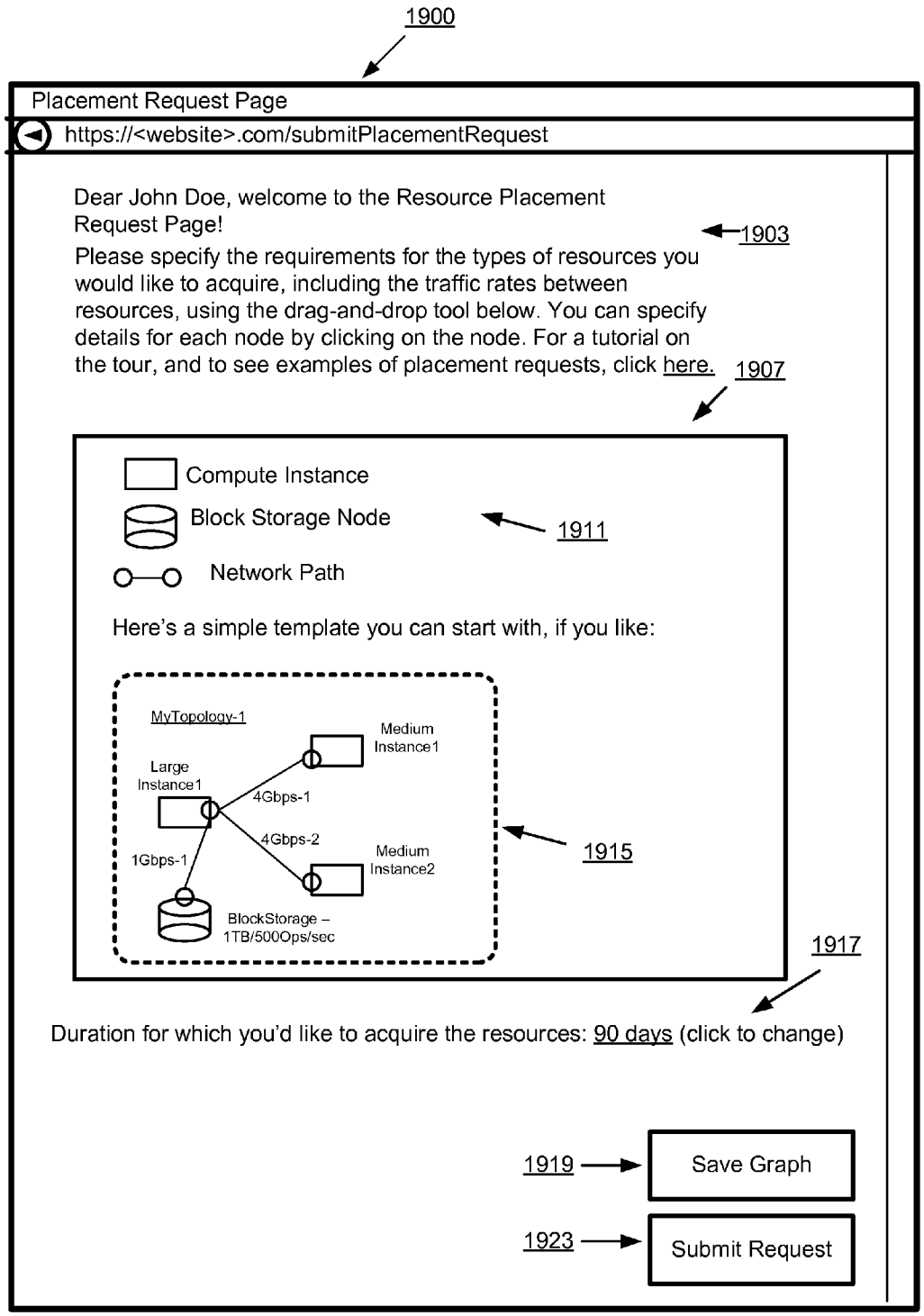
FIG. 19 illustrates a portion of an example web-based interface that may be implemented to allow clients to submit resource placement requests, according to at least one embodiment.

FIG. 19 illustrates a portion of an example web-based interface that may be implemented to allow clients 148 to submit resource placement requests 1605, according to at least one embodiment. As shown, the interface comprises a web page 1900 that includes a message area 1903 and a graphical input area 1907 in which clients can specify desired resource capabilities and interconnect topologies. In the depicted example, clients 148 may drag and drop icons 1911 representing resources such as compute instances and block storage nodes into a network graph whose edges represent network paths between the resources. Desired traffic rates may be specified for each network path, and performance capabilities or other details of the resources may be specified by clicking on the icons as indicated in message area 1903. For compute instances, for example, the client may be able to choose between a plurality of instance sizes to specify performance capabilities (e.g., small vs. medium vs. large instances may be specified), while for block storage nodes, a total storage capacity (e.g., 1 TeraByte) and an operations per second metric (e.g., 500 I/O operations/second) may be provided as an indication of performance capability.

Using the graphical input area 1907, the client 148 may be able to specify fairly complex desired topologies in the depicted embodiment. In some implementations, an interface similar to that shown in FIG. 19 may also allow hierarchical composition of the client's resource graph, e.g., where subnetworks could be expanded to fill greater detail than may be included within a single web page. In some embodiments, the client may be able to specify a duration for which the resources are to be allocated, e.g., using element 1917 of web page 1900. After the client has finalized a desired network graph 1915, they may submit the graph as a placement request 1605 to the resource manager 180 using button 1923. To save an interim or final version of the desired client topology, the client may click on button 1921. In at least some implementations, after the resources with the requested capabilities and allocated to the client, a similar graphical view may be provided showing measured network traffic between the allocated resources. For example, an edge representing a network path between two resources may be shown using a green line if the measured traffic rate is less than 70% of the requested rate limit between the two resources, a yellow line if the measured traffic rate is between 70% and 90%, and a red line if the measured traffic rate exceeds 90% of the limit. Using such dynamic graphical illustrations of traffic rates may allow clients to proactively submit requests to increase (or decrease) traffic rate limits for specific resources, e.g., using allocation requests similar to those described above in conjunction with the description FIG. 2.

It is noted that various additional web pages or other interfaces may be implemented to allow clients to submit placement requests 1605 in some embodiments—for example, a client 148 may be allowed to specify resource pairs using JSON or XML, and submit the file via a command-line tool or an API invocation. Similar remarks also apply to the other web interfaces illustrated in FIGS. 8, 11, and 15. It is also noted that at least some of the operations illustrated in flow diagrams such as those shown in FIGS. 7, 10, 14 and 18 may be performed in a different order than that shown, or in parallel with other operations. For example, at least in some embodiments the resource manager 180 may be implemented using a plurality of threads, such that one set of threads may be responding to a placement request, while another set of threads is initiating configuration of an emulated circuit-switching environment. Similar types of configuration operations and pricing techniques may be applicable to several of the functions supported by the resource manager in some embodiments, such as bandwidth pool creation and allocation, circuit switching emulation, and/or resource placement.

Use Cases

The techniques implemented using the resource manager, described above, may prove to be extremely useful in a number of different scenarios. In many conventional provider networks, resources such as compute instances may typically be assigned bandwidth usage limits without an understanding of the specific types of applications to be deployed on the resources, or of the patterns of network traffic likely to be generated from those applications. In some cases, in fact, the default system-assigned bandwidth limits may be set so high that if a client were to actually try to transfer data at the assigned limits from more than a few resources, some network segments may become saturated, especially along routes crossing data center boundaries or region boundaries. By allowing clients to specify bandwidth pools for different types of traffic associated with client-defined resource groups, and allocating portions of the total traffic rate to individual resources within such groups based on the specific needs of the different components of the application, a resource manager may be able to avoid several types of problem scenarios, such as severe network congestion and consequent poor network performance. In many application scenarios, such as some high-performance computing applications, a resource group such as cluster of N compute instance nodes may only need high traffic rates in and out of the cluster to be supported for one or a few of the nodes, such as a "head node" of the cluster. The extra-group traffic rate limits for the remaining nodes may be set low without affecting the performance of the cluster in many cases.

Similarly, the ability of a resource manager to allow clients to choose the pricing model to be used for the network traffic in and out of different resources independently may result in clients being able to reduce their total costs by, for example, choosing less expensive pricing options such as long-term reservation based pricing for traffic that is expected to flow at a relatively constant rate, and relying on different options such as spot pricing or on-demand pricing for infrequent data transfers. Time-window based pricing may allow clients to schedule some data transfers that may not be urgent during low-cost periods, and at the same time help the resource manager to reduce the traffic during peak usage periods.

The resource manager's ability to emulate circuit switching between specified endpoints may be very helpful to clients that, for example, have different resource groups set up in different geographies or different data centers, and wish to retain reliable and performant networking paths between the remote groups for some time. Clients that are able to predict their application traffic patterns in some detail may be able to obtain optimized routes (e.g., routes with a lower likelihood of contention for bandwidth from other clients' applications) using the placement-related functionality of the resource manager.

Illustrative Computer System

Figure 20:
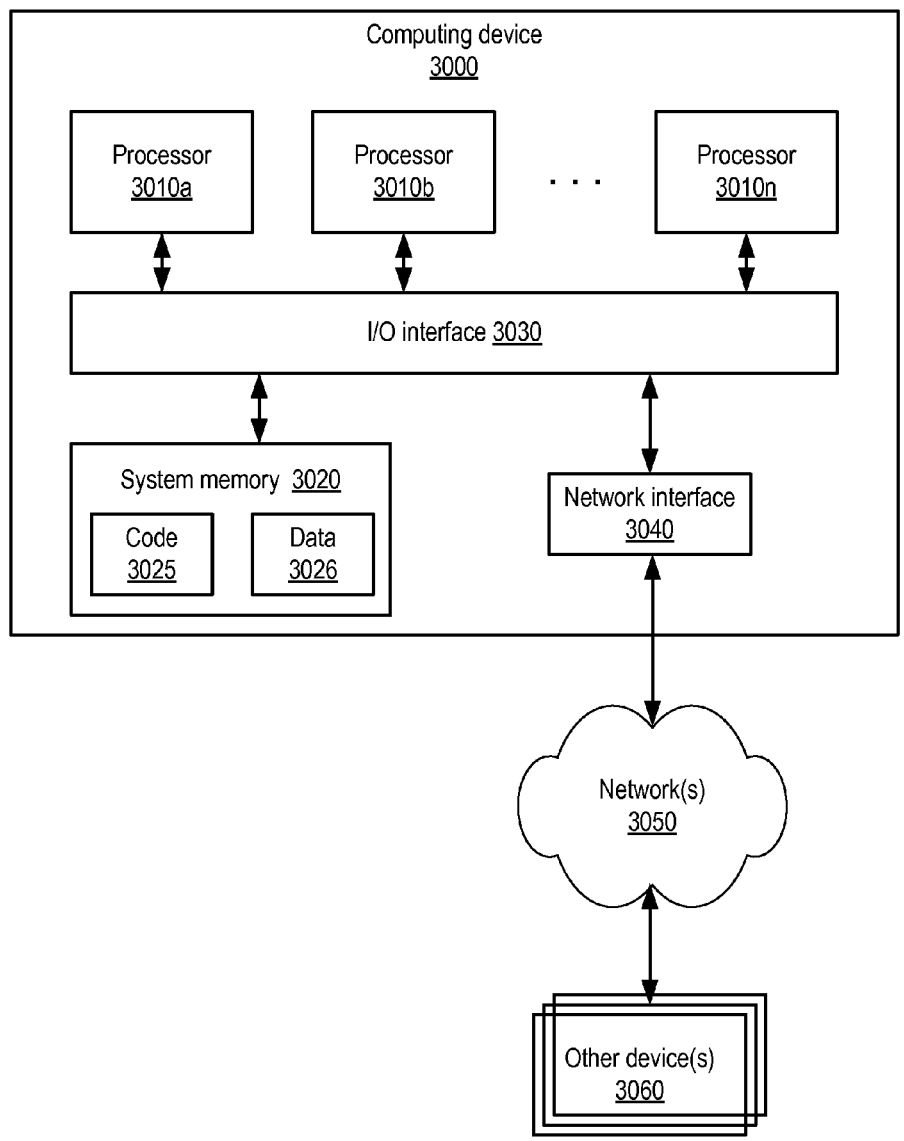
FIG. 20 is a block diagram illustrating an example computing device that may be used in some embodiments.

In at least some embodiments, a server that implements a portion or all of one or more of the technologies described herein, including the techniques to implement the functionality of the resource manager and its subcomponents (such as the interface manager, pricing manager, metrics collector and placement optimizer), may include a general-purpose computer system that includes or is configured to access one or more computer-accessible media. FIG. 20 illustrates such a general-purpose computing device 3000. In the illustrated embodiment, computing device 3000 includes one or more processors 3010 coupled to a system memory 3020 via an input/output (I/O) interface 3030. Computing device 3000 further includes a network interface 3040 coupled to I/O interface 3030.

In various embodiments, computing device 3000 may be a uniprocessor system including one processor 3010, or a multiprocessor system including several processors 3010 (e.g., two, four, eight, or another suitable number). Processors 3010 may be any suitable processors capable of executing instructions. For example, in various embodiments, processors 3010 may be general-purpose or embedded processors implementing any of a variety of instruction set architectures (ISAs), such as the x86, PowerPC, SPARC, or MIPS ISAs, or any other suitable ISA. In multiprocessor systems, each of processors 3010 may commonly, but not necessarily, implement the same ISA.

System memory 3020 may be configured to store instructions and data accessible by processor(s) 3010. In various embodiments, system memory 3020 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing one or more desired functions, such as those methods, techniques, and data described above, are shown stored within system memory 3020 as code 3025 and data 3026.

In one embodiment, I/O interface 3030 may be configured to coordinate I/O traffic between processor 3010, system memory 3020, and any peripheral devices in the device, including network interface 3040 or other peripheral interfaces. In some embodiments, I/O interface 3030 may perform any necessary protocol, timing or other data transformations to convert data signals from one component (e.g., system memory 3020) into a format suitable for use by another component (e.g., processor 3010). In some embodiments, I/O interface 3030 may include support for devices attached through various types of peripheral buses, such as a variant of the Peripheral Component Interconnect (PCI) bus standard or the Universal Serial Bus (USB) standard, for example. In some embodiments, the function of I/O interface 3030 may be split into two or more separate components, such as a north bridge and a south bridge, for example. Also, in some embodiments some or all of the functionality of I/O interface 3030, such as an interface to system memory 3020, may be incorporated directly into processor 3010.

Network interface 3040 may be configured to allow data to be exchanged between computing device 3000 and other devices 3060 attached to a network or networks 3050, such as other computer systems or devices as illustrated in FIGS. 1 through 19, for example. In various embodiments, network interface 3040 may support communication via any suitable wired or wireless general data networks, such as types of Ethernet network, for example. Additionally, network interface 3040 may support communication via telecommunications/telephony networks such as analog voice networks or digital fiber communications networks, via storage area networks such as Fibre Channel SANs, or via any other suitable type of network and/or protocol.

In some embodiments, system memory 3020 may be one embodiment of a computer-accessible medium configured to store program instructions and data as described above for FIGS. 1 through 19 for implementing embodiments of the corresponding methods and apparatus. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computing device 3000 via I/O interface 3030. A non-transitory computer-accessible storage medium may also include any volatile or non-volatile media such as RAM (e.g. SDRAM, DDR SDRAM, RDRAM, SRAM, etc.), ROM, etc, that may be included in some embodiments of computing device 3000 as system memory 3020 or another type of memory. Further, a computer-accessible medium may include transmission media or signals such as electrical, electromagnetic, or digital signals, conveyed via a communication medium such as a network and/or a wireless link, such as may be implemented via network interface 3040. Portions or all of multiple computing devices such as that illustrated in FIG. 19 may be used to implement the described functionality in various embodiments; for example, software components running on a variety of different devices and servers may collaborate to provide the functionality. In some embodiments, portions of the described functionality may be implemented using storage devices, network devices, or special-purpose computer systems, in addition to or instead of being implemented using general-purpose computer systems. The term "computing device", as used herein, refers to at least all these types of devices, and is not limited to these types of devices.

CONCLUSION

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc, as well as transmission media or signals such as electrical, electromagnetic, or digital signals, conveyed via a communication medium such as network and/or a wireless link.

The various methods as illustrated in the Figures and described herein represent exemplary embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended to embrace all such modifications and changes and, accordingly, the above description to be regarded in an illustrative rather than a restrictive sense.

What is claimed is:

1. A system, comprising:
a plurality of computing devices configured to implement a plurality of resources in a cloud computing environment within a provider network; and
one or more computing devices configured to implement an interface for a client device of a client to generate and submit circuit switching emulation requests for emulated circuits between resource endpoints within the provider network, wherein the interface is configured to enable the client to specify at least three parameters for an emulated circuit between cloud resources within the provider network via at least three separate descriptor data fields, wherein the one or more computing devices are further configured to:
receive a circuit switching emulation request from the client device, wherein the circuit switching emulation request received from the client device comprises the at least three separate descriptor data fields, wherein the at least three separate descriptor data fields comprise:
(a) a first descriptor data field comprising descriptor data specifying a first one of the at least three parameters comprising a first cloud resource group including descriptor data specifying a first resource endpoint for the first cloud resource group,
(b) a second descriptor data field comprising additional descriptor data specifying a second one of the at least three parameters comprising a second cloud resource group including descriptor data specifying a second resource endpoint for the second resource group, wherein each of the first and second cloud resource groups comprises one or more cloud resources within the provider network and at least one cloud resource of the first cloud resource group is allocated to the client, and
(c) a third descriptor data field comprising descriptor data specifying a third one of the at least three parameters comprising a desired network traffic rate between the first and second cloud resource groups,
in response to a determination to accept the circuit switching emulation request, initiate one or more configuration operations associated with a network path between the first resource end-point and the second resource end-point to allow network traffic within the provider network between the first and second cloud resource groups at a rate up to the desired network traffic rate; and
subsequent to initiating the one or more configuration operations, send a notification to the client device indicating that the emulated circuit has been established between the first and second resource end-points.

2. The system as recited in claim 1, wherein the one or more computing devices are further operable to:
   initiate a bandwidth throttling operation to discard one or more network packets transmitted from the first resource end-point to the second resource end-point in response to a detection of a transfer rate in excess of the desired network traffic rate.

3. The system as recited in claim 1, wherein the circuit switching emulation request comprises an indication of one or more properties of a network route to be used between the first and second cloud resource groups, wherein the one or more configuration operations comprise at least one routing configuration operation in accordance with the indication.

4. The system as recited in claim 1, wherein the circuit switching emulation request comprises a designation of the first resource end-point of the first resource group as a gateway resource for traffic between the first resource group and the second resource group, wherein the one or more computing devices are further operable to:
   initiate one or more networking configuration operations to route, via the gateway resource, traffic that originates at resource of the first cloud resource group other than the first resource end-point and has a destination within the second cloud resource group.

5. The system as recited in claim 1, wherein the desired network traffic rate is specified for traffic originating at the first cloud resource group and directed at the second cloud resource group, and wherein the circuit switching emulation request comprises a second desired network traffic rate to be supported for traffic originating at the second cloud resource group and directed at the first cloud resource group, wherein the one or more computing devices are further operable to:
   initiate one or more additional configuration operations associated with the network path to allow network traffic originating at the second cloud resource group and directed at the first cloud resource group at a rate up to the second desired network traffic rate.

6. A method, comprising:
   implementing an interface for a client device of a client of a provider network to allow the client to submit a circuit switching emulation request for an emulated switched circuit between cloud resources of the provider network wherein the provider network comprises a plurality of computing devices that implement a cloud computing environment;
   receiving, via the interface, the circuit switching emulation request from the client device, wherein the circuit switching emulation request comprises at least three separate descriptor data fields that enable the client of the provider network to specify at least three separate parameters for the emulated circuit between cloud resources of the provider network, wherein the at least three separate descriptor data fields comprise:
   (a) a first descriptor data field comprising descriptor data specifying a first one of the at least three parameters comprising a first resource end-point for a first cloud resource group,
   (b) a second descriptor data field comprising additional descriptor data specifying a second one of the at least three parameters comprising a second resource end-point for a second cloud resource group, wherein each of the first and second cloud resource groups comprises one or more resources of the provider network and at least one cloud resource of the first resource group is allocated to the client, and
   (c) a third descriptor data field comprising data specifying a third one of the at least three parameters comprising a desired network traffic rate to be supported between the first and second cloud resource groups; and
   in response to a determination to accept the circuit switching emulation request, initiating one or more configuration operations associated with a network path between the first and second cloud resource groups to allow network traffic between the first and second cloud resource groups at a rate up to the desired network traffic rate; and
   subsequent to initiating the one or more configuration operations, sending a notification to the client device indicating that the emulated circuit has been established between the first and second resource end-points.

7. The method as recited in claim 6, further comprising:
   initiating a bandwidth throttling operation to discard one or more network packets transmitted from the first resource end-point to the second resource end-point in response to a detection of a transfer rate in excess of the desired network traffic rate.

8. The method as recited in claim 6, wherein the circuit switching emulation request comprises an indication of one or more properties of a network route to be used between the first and second cloud resource groups, wherein the one or more configuration operations comprise at least one routing configuration operation in accordance with the indication.

9. The method as recited in claim 6, wherein the circuit switching emulation request comprises a designation of the first resource end-point of the first cloud resource group as a gateway resource for traffic between the first cloud resource group and the second cloud resource group, further comprising:
   initiating one or more networking configuration operations to route, via the gateway resource, traffic that originates at resource of the first cloud resource group other than the first resource end-point and has a destination within the second cloud resource group.

10. The method as recited in claim 6, wherein the desired network traffic rate is specified for traffic originating at the first cloud resource group and directed at the second cloud resource group, and wherein the circuit switching emulation request comprises a second desired network traffic rate to be supported for traffic originating at the second cloud resource group and directed at the first cloud resource group, further comprising:
   initiating one or more additional configuration operations associated with the network path to allow network traffic originating at the second cloud resource group and directed at the first cloud resource group at a rate up to the second desired network traffic rate.

11. The method as recited in claim 6, further comprising:
   determining whether to accept the circuit switching emulation request based at least in part on at least one of: (a) a bid amount included in the request, (b) a circuit emulation duration indicated in the request, or (c) analysis of network traffic metrics of the provider network.

12. The method as recited in claim 6, wherein the first cloud resource group comprises a plurality of compute resources configured to implement a distributed application, and wherein the second cloud resource group comprises a plurality of storage resources at which at least a portion of data manipulated by the distributed application is stored.

13. The method as recited in claim 6, wherein the first cloud resource group comprises a plurality of cloud resources in a particular availability zone, and wherein the second cloud resource group comprises at least one cloud resource in a different availability zone.

14. A non-transitory computer-accessible storage medium storing program instructions that when executed on one or more processors:
  implement an interface for a client device of a client of a provider network to allow the client to submit a circuit switching emulation request for an emulated switched circuit between cloud resources of the provider network wherein the provider network comprises a plurality of computing devices that implement a cloud computing environment;
  receive, via the interface, the circuit switching emulation request from the client device, wherein the circuit switching emulation request comprises at least three separate descriptor data fields that enable the client of the provider network to specify at least three separate parameters for an emulated circuit between cloud resources of the provider network, wherein the at least three descriptor data fields comprise:
    (a) a first descriptor data field comprising descriptor data specifying a first one of the at least three parameters comprising a first resource end-point for a first cloud resource group,
    (b) a second descriptor data field comprising additional descriptor data specifying a second one of the at least three parameters comprising a second resource end-point for a second cloud resource group, wherein each of the first and second cloud resource groups comprises one or more cloud resources of the provider network and at least one cloud resource of the first resource group is allocated to the client, and
    (c) a third descriptor data field comprising data specifying a third one of the at least three parameters comprising a desired network traffic rate to be supported between the first and second cloud resource groups;
  in response to a determination to accept the circuit switching emulation request, initiate one or more configuration operations associated with a network path between the first and second cloud resource groups to allow network traffic between the first and second cloud resource groups at a rate up to the desired network traffic rate; and
  subsequent to initiating the one or more configuration operations, send a notification to the client device indicating that the emulated circuit has been established between the first and second resource endpoints.

15. The storage medium as recited in claim 14, wherein the instructions when executed on the one or more processors:
  initiate an operation to discard one or more network packets transmitted from the first cloud resource group to the second cloud resource group in response to a detection of a transfer rate in excess of the desired network traffic rate.

16. The storage medium as recited in claim 14, wherein the circuit switching emulation request comprises an indication of one or more preferences for a network route to be used between the first and second cloud resource groups, wherein the one or more configuration operations comprise at least one routing configuration operation in accordance with the indication.

17. The storage medium as recited in claim 14, wherein the circuit switching emulation request comprises a designation of the first resource end-point of the first resource group as a gateway resource for traffic between the first cloud resource group and the second cloud resource group, wherein the instructions when executed on the one or more processors:
  initiate one or more networking configuration operations to route, via the gateway resource, traffic that originates at resource of the first cloud resource group other than the first resource end-point and has a destination within the second cloud resource group.

18. The storage medium as recited in claim 14, wherein the desired network traffic rate is specified for traffic originating at the first cloud resource group and directed at the second cloud resource group, wherein the circuit switching emulation request comprises a second desired network traffic rate to be supported for traffic originating at the second cloud resource group and directed at the first cloud resource group, wherein the instructions when executed on the one or more processors:
  initiate one or more additional configuration operations associated with the network path to allow network traffic originating at the second cloud resource group and directed at the first cloud resource group at a rate up to the second desired network traffic rate.

19. The storage medium as recited in claim 14, wherein the instructions when executed on the one or more processors:
  determine whether to accept the circuit switching emulation request based at least in part on at least one of: (a) a bid amount included in the request, (b) a circuit emulation duration indicated in the request, or (c) analysis of network traffic metrics of the provider network.

20. The storage medium as recited in claim 14, wherein the first cloud resource group comprises a plurality of compute resources configured to implement a distributed application, and wherein the second cloud resource group comprises a plurality of storage resources at which at least a portion of data manipulated by the distributed application is stored.

21. The storage medium as recited in claim 14, wherein the first cloud resource group comprises a plurality of resources in a particular data center, and wherein the second cloud resource group comprises at least one resource in a different data center.

* * * * *